US011048876B2

(12) United States Patent
Gee et al.

(10) Patent No.: US 11,048,876 B2
(45) Date of Patent: *Jun. 29, 2021

(54) PHRASE EXTRACTION FOR OPTIMIZING DIGITAL PAGE

(71) Applicant: Microsoft Technology Licensing, LLC, Redmond, WA (US)

(72) Inventors: Jeffrey Douglas Gee, San Francisco, CA (US); Rohan Ramanath, Saratoga, CA (US); Deepak Kumar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,292

(22) Filed: Nov. 30, 2018

(65) Prior Publication Data

US 2020/0175108 A1 Jun. 4, 2020

(51) Int. Cl.
*G06F 40/00* (2020.01)
*G06F 40/289* (2020.01)
(Continued)

(52) U.S. Cl.
CPC .......... *G06F 40/289* (2020.01); *G06Q 50/01* (2013.01); *H04L 67/306* (2013.01)

(58) Field of Classification Search
CPC ............... G06F 16/334; G06F 16/3334; G06F 16/3344; G06F 16/345; G06F 16/90; G06F 40/10; G06F 40/00; G06F 40/166; G06F 40/20; G06F 40/205; G06F 40/226; G06F 40/258; G06F 40/274; G06F 40/289; G06F 40/40; G06F 40/131; G06Q 10/1053; H04L 67/306
See application file for complete search history.

(56) References Cited

U.S. PATENT DOCUMENTS 6,721,728 B2 * 4/2004 McGreevy .......... G06F 16/2465
7,263,517 B2 * 8/2007 Sheu ................. G06F 16/24522
(Continued)

OTHER PUBLICATIONS

Z. Siting, H. Wenxing, Z. Ning and Y. Fan, "Job recommender systems: A survey," 2012 7th International Conference on Computer Science & Education (ICCSE), Melbourne, VIC, 2012, pp. 920-924. (Year: 2012).*

(Continued)

*Primary Examiner* — Edgar X Guerra-Erazo
(74) *Attorney, Agent, or Firm* — Schwegman Lundberg & Woessner, P.A.

(57) ABSTRACT

Techniques for improving the accuracy, relevancy, and efficiency of a computer system of an online service by providing a user interface to optimize a digital page of a user on the online service are disclosed herein. In some embodiments, a computer system receives a plurality of phrases for a type of job, selects a group of phrases from the plurality of phrases based on a corresponding relevancy measurement and a corresponding diversity measurement for each phrase in the selected group of phrases, and generates a recommendation for a page of a first user based on the selected group of phrases, with the recommendation comprising a suggested addition of the selected group of phrases to the page of the first user.

20 Claims, 15 Drawing Sheets

(51) Int. Cl.
  *G06Q 50/00* (2012.01)
  *H04L 29/08* (2006.01)

(56) References Cited

U.S. PATENT DOCUMENTS

| | | | | |
|---|---|---|---|---|
| 8,626,761 | B2* | 1/2014 | Kawai | G06F 16/35 |
| | | | | 707/736 |
| 9,367,608 | B1* | 6/2016 | Zhang | G06F 16/35 |
| 9,449,080 | B1* | 9/2016 | Zhang | G06F 40/30 |
| 9,910,914 | B1* | 3/2018 | Cowley | G06N 5/022 |
| 10,496,662 | B2* | 12/2019 | Kenthapadi | G06F 16/951 |
| 10,552,465 | B2* | 2/2020 | Kenthapadi | G06F 16/334 |
| 10,553,308 | B2* | 2/2020 | Baldwin | G06F 40/30 |
| 10,593,423 | B2* | 3/2020 | Baldwin | G06F 40/205 |
| 2004/0133560 | A1* | 7/2004 | Simske | G06F 16/355 |
| 2007/0226204 | A1* | 9/2007 | Feldman | G06F 16/9024 |
| 2008/0033932 | A1* | 2/2008 | DeLong | G06F 16/951 |
| 2010/0005087 | A1* | 1/2010 | Basco | G06F 16/951 |
| | | | | 707/E17.017 |
| 2010/0228693 | A1* | 9/2010 | Dawson | G06F 16/322 |
| | | | | 706/12 |
| 2011/0004462 | A1* | 1/2011 | Houghton | G10L 15/183 |
| | | | | 704/9 |
| 2012/0303603 | A1* | 11/2012 | Kim | G06F 3/0483 |
| | | | | 707/706 |
| 2013/0198099 | A1 | 8/2013 | Hyder et al. | |
| 2014/0046934 | A1* | 2/2014 | Zhou | G06F 16/24526 |
| | | | | 707/723 |
| 2014/0244612 | A1 | 8/2014 | Bhasin et al. | |
| 2015/0120593 | A1 | 4/2015 | Madhavan et al. | |
| 2015/0370782 | A1* | 12/2015 | Fan | G06F 40/211 |
| | | | | 704/9 |
| 2016/0012119 | A1* | 1/2016 | Franceschini | G06F 16/3332 |
| | | | | 707/722 |
| 2017/0242917 | A1* | 8/2017 | Kenthapadi | G06F 16/3344 |

OTHER PUBLICATIONS

N. D. Almalis, G. A. Tsihrintzis and N. Karagiannis, "A content based approach for recommending personnel for job positions," USA 2014, The 5th International Conference on Information, Intelligence, Systems and Applications, Chania, 2014, pp. 45-49. (Year: 2014).*

"Non Final Office Action issued in U.S. Appl. No. 16/206,264", dated Oct. 26; 2020, 11 Pages.

* cited by examiner

SENIOR SOFTWARE DESIGNER
LINKEDIN
SAN FRANCISCO BAY AREA
POSTED 2 DAYS AGO – 682 VIEWS

[ SAVE ]   [ APPLY ]

JOB DESCRIPTION
WE ARE LOOKING FOR A HARD WORKING PASSIONATE SENIOR SOFTWARE ENGINEER WITH A FOCUS ON BOTH INTERFACE AND VISUAL DESIGN. THE IDEAL CANDIDATE IS A TEAM LEADER AND HAS EXPERIENCE IN DIGITAL ENTERPISE PRODUCTS OR SOFTWARE-AS-A-SERVICE, CREATING VISUALIZATIONS, CHARTS, AND DASHBOARDS.

SENIORITY LEVEL
SENIOR

INDUSTRY
COMPUTER SOFTWARE, INFORMATION TECHNOLOGY AND SERVICES, INTERNET

EMPLOYMENT TYPE
FULL-TIME

REQUIREMENTS
- 5+ YEARS PROFESSIONAL EXPERIENCE IN WEB DESIGN
- EXPERIENCE WORKING WITH LARGE, HIGH-TRAFFIC E-COMMERCE WEBSITES
- EXPERIENCE WITH HTML/CSS AND JAVASCRIPT

SEE MORE ▽

*FIG. 5*

YOUR SUMMARY REPORT

BASED ON: SENIOR SOFTWARE ENGINEER JOBS

---

OVERVIEW

FORMAT — 710-1
RECRUITERS LIKE BULLET POINTS FOR READABILITY

---

MEASURABLE RESULTS — 710-2
RECRUITERS LIKE SEEING YOUR TOP ACHIEVEMENTS AND OTHER MEASURABLE RESULTS IN YOUR SUMMARY

FOR SENIOR SOFTWARE ENGINEER RECRUITERS, FOCUS ON MEASURABLE RESULTS IN THESE AREAS:
  + LEADERSHIP — 712-1
  + A/B TESTING — 712-2

---

TRY THESE PHRASES
WE ANALYZED SENIOR SOFTWARE ENGINEER JOBS TO FIND PHRASES RECRUITERS LOVE. TAP A PHRASE BELOW TO USE IT IN YOUR SUMMARY.

ON LEADERSHIP — 720-1
*HIGH IMPORTANCE*
COACHED MY TEAM ON A BUSINESS STRATEGY ...  + — 725-1

---

ON A/B TESTING — 720-2
*MEDIUM IMPORTANCE*
EXCEEDED EXPECTATIONS THROUGH A/B TESTING ...  + — 725-2

---

ON COLLABORATION — 720-3
*MEDIUM IMPORTANCE*
WORKED CROSS-FUNCTIONALITY TO CREATE ...  + — 725-3

---

ON ENGINEER — 720-4
*MEDIUM IMPORTANCE*
SAT AS AN ENGINEER ...  + — 725-4

---

ON USER RESEARCH — 720-5
*MEDIUM IMPORTANCE*
CONDUCTED USER RESEARCH TO DETERMINE ...  + — 725-5

*FIG. 7*

PHRASE EXTRACTION FOR OPTIMIZING DIGITAL PAGE

TECHNICAL FIELD

The present application relates generally to systems, methods, and computer program products for improving the accuracy, relevancy, and efficiency of a computer system of an online service by providing a user interface to optimize a digital page of a user on the online service.

BACKGROUND

Digital pages of users of online services often omit relevant data. This lack of data can cause technical problems in the performance of the online service. For example, in situations where the online service is performing a search based on search criteria for a certain type of data, pages are often omitted from the search because their profiles lack that type of data even though they would have satisfied the search criteria if the page had included the corresponding data. As a result, the accuracy, relevancy, and completeness of the search results are diminished. Additionally, since otherwise relevant search results are omitted, users often spend a longer time on their search, consuming electronic resources (e.g., network bandwidth, computational expense of server performing search). Thus, the function of the computer system of the online service suffers. Furthermore, the prior art lacks a convenient and efficient way for users to add such relevant data to their pages or to specific sections of their pages. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 illustrates a GUI in which a job posting published on an online service is displayed, in accordance with an example embodiment.

FIG. 7 illustrates a GUI in which recommendations for optimizing a page of a user are displayed, in accordance with an example embodiment.

DETAILED DESCRIPTION

I. Overview

Figure 1:
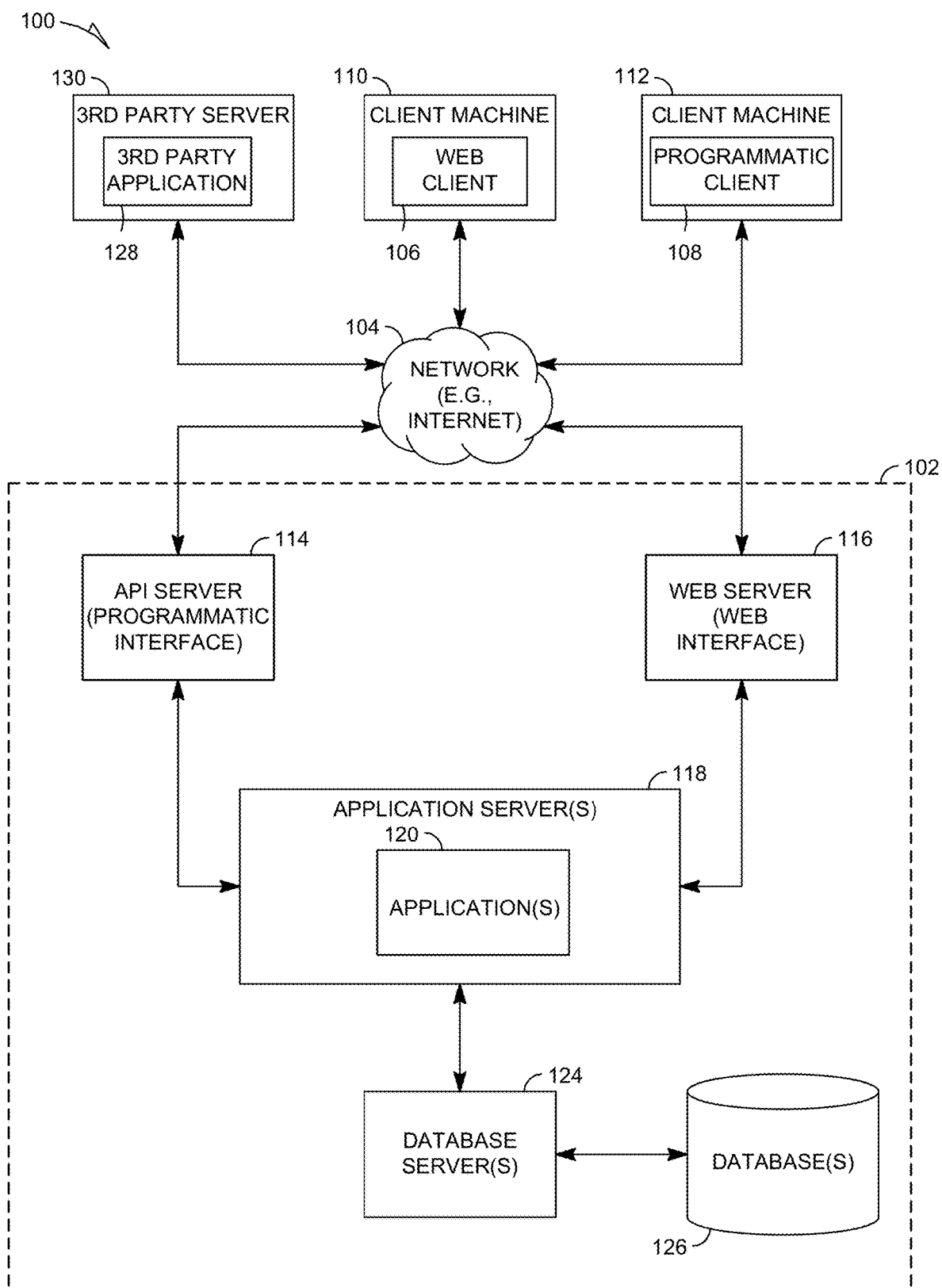
FIG. 1 is a block diagram illustrating a client-server system, in accordance with an example embodiment.

Example methods and systems of improving the accuracy, relevancy, and efficiency of a computer system of an online service by providing a user interface to optimize a digital page of a user on the online service are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein, which provide methods and user interfaces for adding accurate and relevant data to a page of a user on an online service in a convenient and efficient manner. In some example embodiments, a computer system identifies job postings corresponding to a type of job that a user is interested in or is likely to be interested in based on feature data (e.g., a role within an organization, a seniority level, an industry) of the job postings, and then extracts phrases from the identified job postings, giving preference to phrases that are most relevant to the type of job of the job postings, while enforcing sufficient diversity amongst the extracted phrases in order to avoid redundancy and wasted display space. For each one of the extracted phrases, the computer system determines a corresponding section of a page of the user to suggest for placement of the extracted phrase using a placement classifier, and then generates a corresponding recommendation for the page of the user based on the extracted phrase and the corresponding section of the extracted phrase. Each recommendation comprises a suggested addition of the corresponding phrase to the corresponding section of the page of the user. The generated recommendations are displayed on a computing device of the user. In some example embodiments, selectable user interface elements corresponding to the generated recommendations are displayed and configured to enable the user to conveniently and efficiently add the phrases, or portions thereof, to the page of the user.

Each of the steps of identifying job postings, extracting phrases from the identified job postings, determining corresponding sections of a page to suggest for placement of the extracted phrases, generating recommendations for the page, and displaying the generated recommendations involves a non-generic, unconventional, and non-routine combination of operations. By applying one or more of the solutions disclosed herein, some technical effects of the system and method of the present disclosure are to provide a convenient and efficient way for a user of an online service to add accurate and relevant data to a page of the user on the online service. As a result, the functioning of the computer system of the online service is improved. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
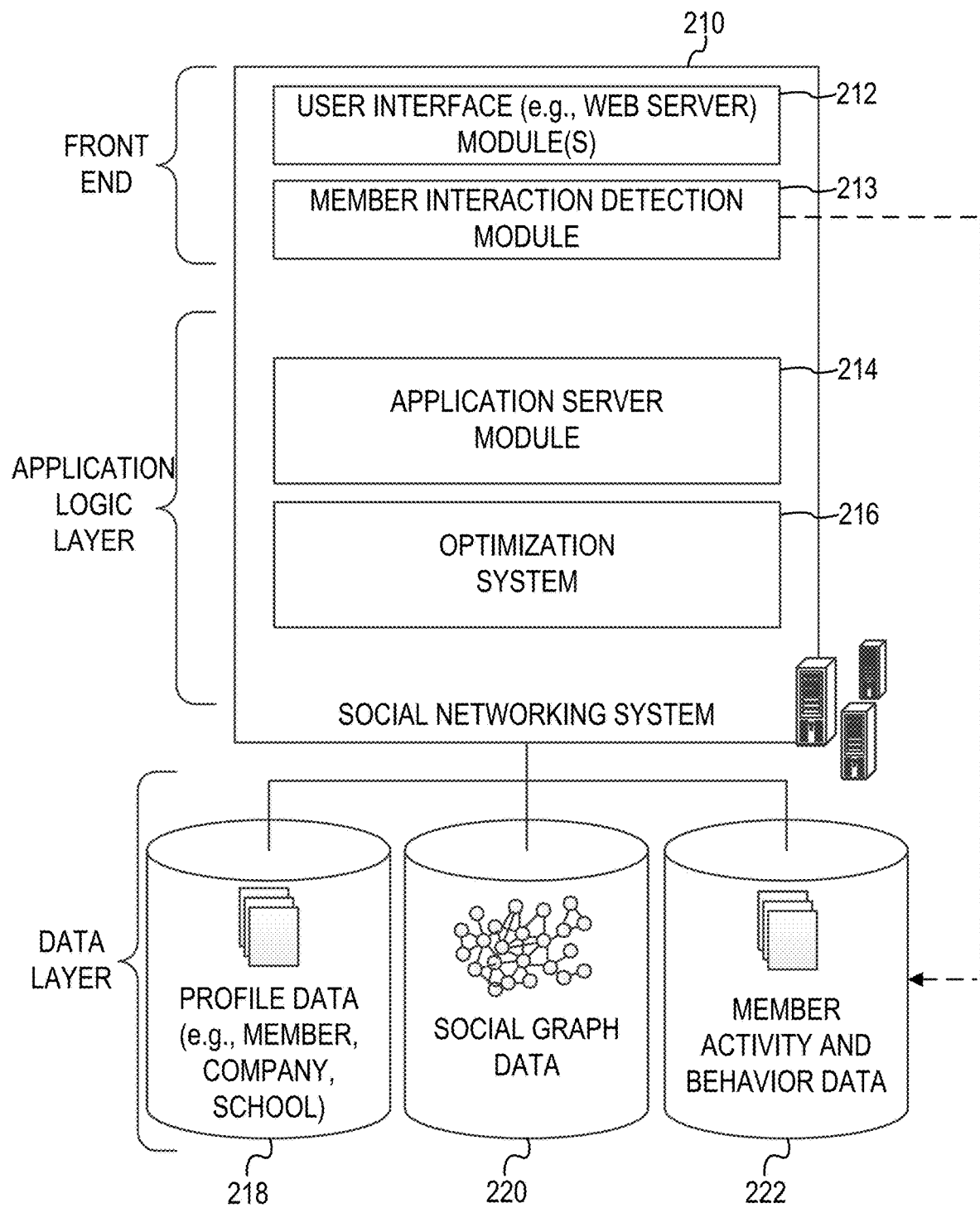
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as an optimization system 216, for use in social networking system 210, consistent with some embodiments of the present disclosure. In some embodiments, the optimization system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the optimization system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the optimization system 216. The members' interactions and behavior may also be tracked, stored, and used by an optimization system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the optimization system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
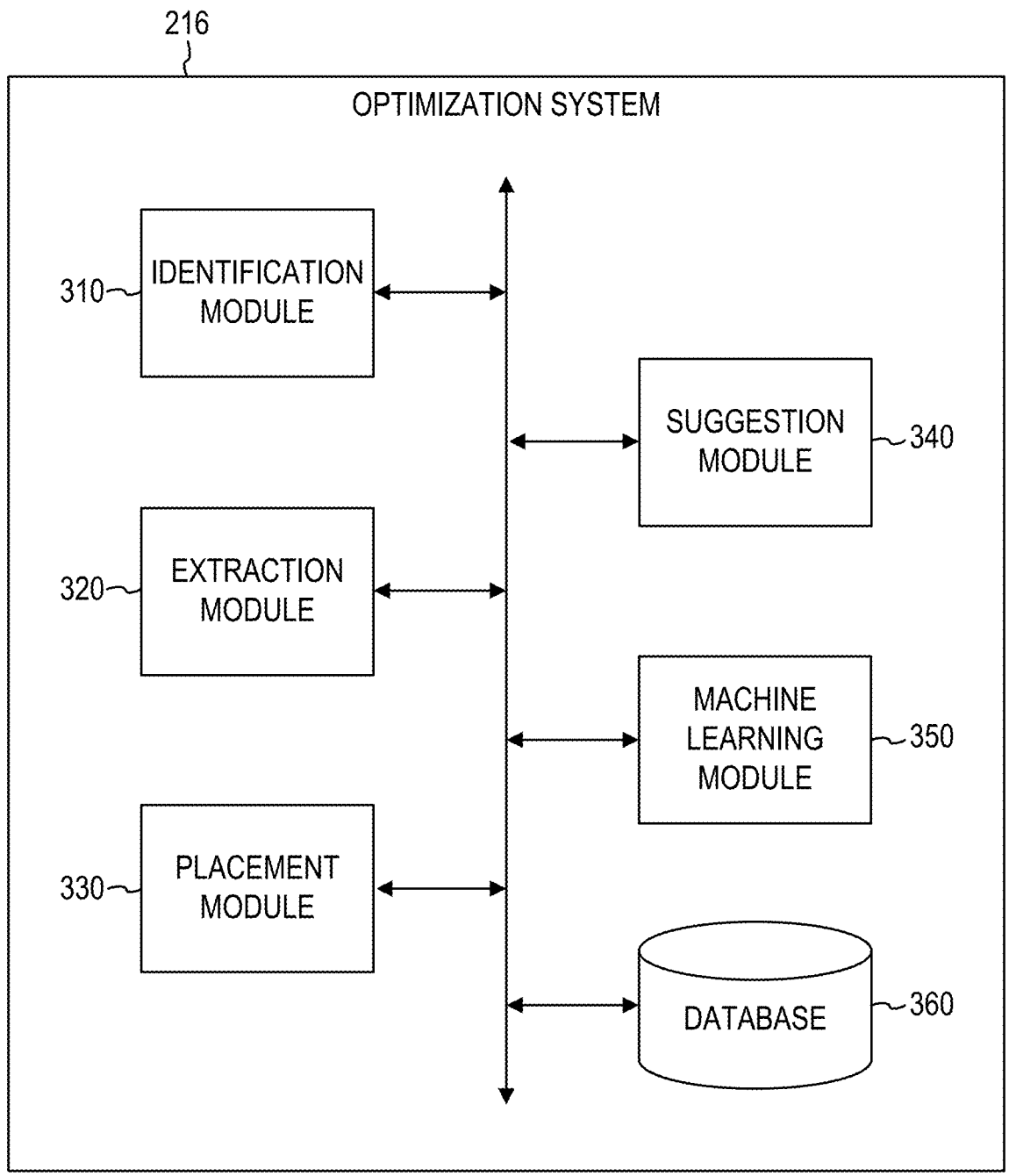
FIG. 3 is a block diagram illustrating an optimization system, in accordance with an example embodiment.

FIG. 3 is a block diagram illustrating the optimization system 216, in accordance with an example embodiment. In some embodiments, the optimization system 216 comprises any combination of one or more of an identification module 310, an extraction module 320, a placement module 330, a suggestion module 340, a machine learning module 350, and one or more databases 360. The modules 310, 320.330, 340, and 350 and the database(s) 360 can reside on a computer system, or other machine, having a memory and at least one processor (not shown). In some embodiments, the modules 310, 320, 330, 340, and 350 and the database(s) 360 can be incorporated into the application server(s) 118 in FIG. 1. In some example embodiments, the database(s) 360 is incorporated into database(s) 126 in FIG. 1 and can include any combination of one or more of databases 218, 220, and 222 in FIG. 2. However, it is contemplated that other configurations of the modules 310, 320, 330, 340, and 350, as well as the database(s) 360, are also within the scope of the present disclosure.

In some example embodiments, one or more of the modules 310, 320, 330, 340, and 350 is configured to perform various communication functions to facilitate the functionality described herein, such as by communicating with the social networking system 210 via the network 104 using a wired or wireless connection. Any combination of one or more of the modules 310, 320.330, 340, and 350 may also provide various web services or functions, such as retrieving information from the third party servers 130 and the social networking system 210. Information retrieved by the any of the modules 310, 320, 330, 340, and 350 may include profile data corresponding to users and members of the social networking service of the social networking system 210.

Additionally, any combination of one or more of the modules 310, 320, 330, 340, and 350 can provide various data functionality, such as exchanging information with the database(s) 360 or servers. For example, any of the modules 310, 320, 330, 340, and 350 can access member profiles that include profile data from the database(s) 360, as well as extract attributes and/or characteristics from the profile data of member profiles. Furthermore, the one or more of the modules 310, 320, 330, 340, and 350 can access profile data, social graph data, and member activity and behavior data from the database(s) 360, as well as exchange information with third party servers 130, client machines 110, 112, and other sources of information.

In some example embodiments, the optimization system 216 is configured to provide a convenient and efficient way for users to add relevant data to their pages or to specific sections of their pages, providing users with insights and suggestions about what they should change on their pages, such as their profile pages and resumes, to improve the quality of their pages and to align the content of their pages with specific objectives (e.g., career aspirations).

The optimization system 216 provides actionable suggestions designed to improve a user's chances in pursuing his or her objectives or interests. These actionable suggestions comprise a finite set of transformations that can be applied to a user's page, such as a profile page of the user or a resume of the user. These transformations can be accomplished in a reasonable amount of time. Examples include, but are not limited to, the addition of particular content, improving composition, and the addition of quantitative detail.

In some example embodiments, the suggestions are based on jobs that users are interested in, as well as known recruiter behavior. For example, the optimization system 216 may suggest that a user include certain information that recruiters look for, such as achievements and other measurable results. The optimization system 216 may also help users align their profiles with the jobs that they are interested in by showing users the keywords and phrases from the descriptions of those jobs.

In some example embodiments, the high-level objective of the optimization system 216 is:

$$\arg\max_{f(r)} P(y|f(r),J),$$

where each r represents a user's current page (e.g., profile or resume), J represents a set of user job interests, $f(r) \in F$ is a transformation outputting a new page r', and y is a signal representing whether or not a user is a good fit for a job, $j \in J$. The feedback signal, y, can be estimated and measured through different data sources, as will be explained later. The high-level objective disclosed above is extremely challenging for the following reasons: (1) how does the optimization system 216 define a user's job interests J; and (2) how does the optimization system 216 constrain the space of page edits/transformations F. Details of how the optimization system 216 addresses these technical challenges will be discussed below.

In some example embodiments, the optimization system 216 identifies job postings corresponding to a type of job that a user is interested in or is likely to be interested in based on feature data (e.g., a role within an organization, a seniority level, an industry) of the job postings, and then extracts phrases from the identified job postings, giving preference to phrases that are most relevant to the type of job of the job postings, while enforcing sufficient diversity amongst the extracted phrases in order to avoid redundancy and wasted display space. For each one of the extracted phrases, the optimization system 216 determines a corresponding section of a page of the user (e.g., a profile page or a resume) to suggest for placement of the extracted phrase using a placement classifier, and then generates a corresponding recommendation for the page of the user based on the extracted phrase and the corresponding section of the extracted phrase. Each recommendation comprises a suggested addition of the corresponding phrase to the corresponding section of the page of the user. The generated recommendations are displayed on a computing device of the user. In some example embodiments, selectable user interface elements corresponding to the generated recommendations are displayed and configured to enable the user to conveniently and efficiently add the phrases, or portions thereof, to the page of the user.

Figure 4:
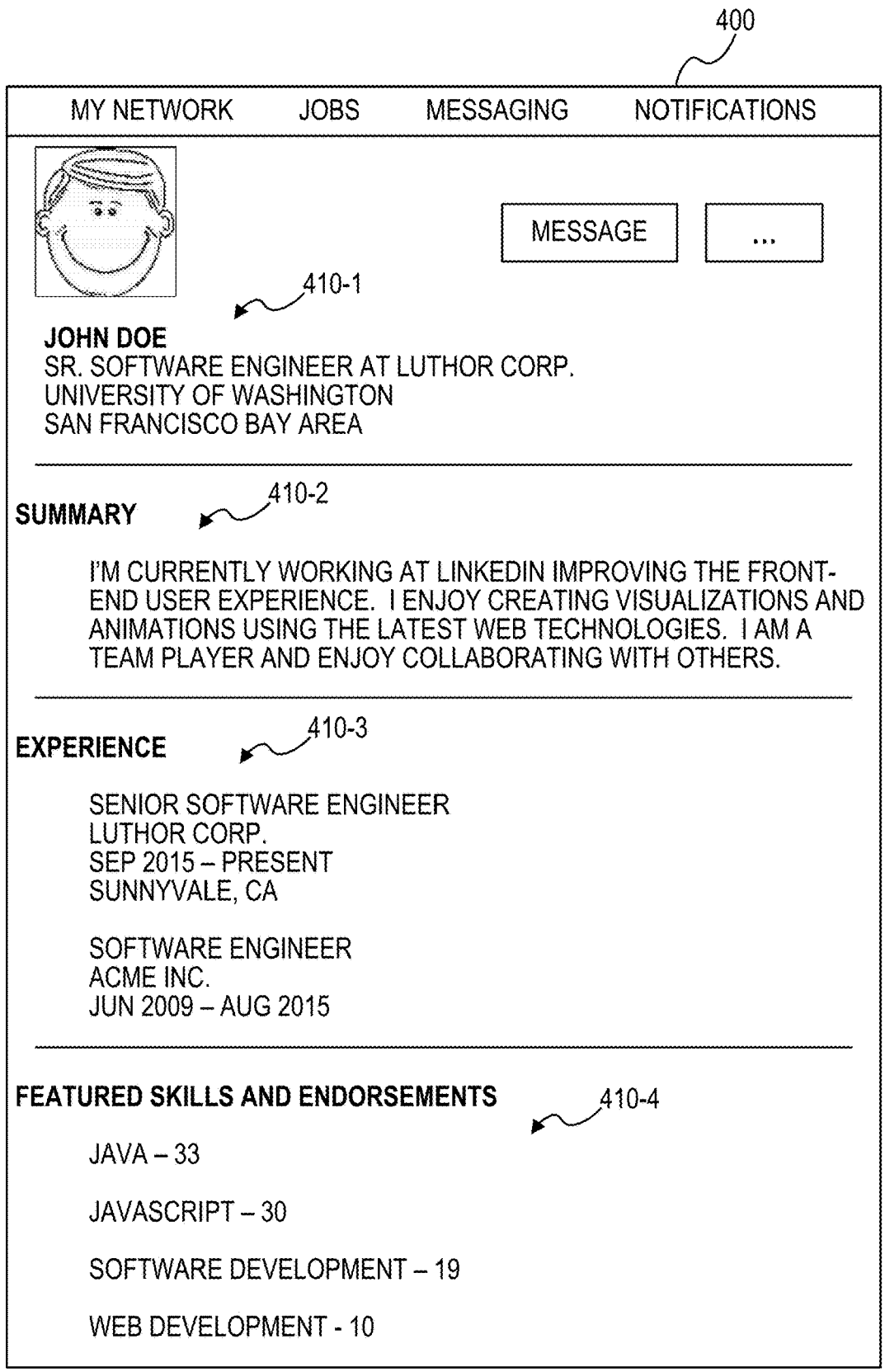
FIG. 4 illustrates a graphical user interface (GUI) in which a profile page of a user is displayed, in accordance with an example embodiment.

FIG. 4 illustrates a graphical user interface (GUI) 400 in which a profile page of a user is displayed, in accordance with an example embodiment. The profile page displayed in the GUI 400 comprises profile data 410 of the user. In the example shown in FIG. 4, the profile data 410 includes headline data 410-1 identifying the user (e.g., photo and name), the user's current position at a particular organization, and the user's current residential location, summary data 410-2, experience data 410-3, and featured skill and endorsement data 410-4. Other types of profile data 410 are also within the scope of the present disclosure. In some example embodiments, the GUI 400 displays each type of profile data 410 in its own dedicated section of profile page.

FIG. 5 illustrates a GUI 500 in which a job posting published on an online service is displayed, in accordance with an example embodiment. In FIG. 5, the job posting comprises headline information 510 and detailed information 512. The headline information 510 comprises basic information about the job posting, such as the job title or position (e.g., "SENIOR SOFTWARE DESIGNER"), the name of the company or organization seeking applicants for the job title or position (e.g., "LINKEDIN"), and the location of the job (e.g., "SAN FRANCISCO BAY AREA"). The detailed information 512 comprises more detailed information about the job, including, but not limited to, a job description, a seniority level of the job, one or more industries to which the job corresponds, an employment type for the job, and requirements for the job. In FIG. 5, the GUI 500 also comprises a selectable user interface element 520 configured to enable a user who is viewing the job posting to submit a job application for the job posting. In some example embodiments, the selectable user interface element 520 comprises a selectable button or link (e.g., the selectable "APPLY" button in FIG. 5) that is configured to, when selected, trigger the social networking system 210 to display another GUI in which the user can submit an application for the job posting.

Figure 6:
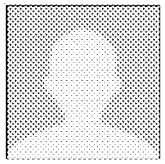
FIG. 6 illustrates a GUI in which a user can submit an application for a job posting, in accordance with an example embodiment.

FIG. 6 illustrates a GUI 600 in which a user can submit an application for a job posting, in accordance with an example embodiment. In some example embodiments, the GUI 600 comprises one or more user interface elements configured to enable the user to submit contact information, such as an e-mail address and/or a destination for receiving a phone call and/or text messages (e.g., a phone number). For example, the GUI 600 comprises a text field 610 configured to receive an e-mail address of the user, as well as a text field 612 configured to receive a destination for receiving a phone call and/or text messages. In some example embodiments, the GUI 600 also comprises one or more user interface elements configured to enable the user to submit a resume. For example, the GUI 600 comprises a selectable user interface element 620 configured to enable the user to upload a resume in a certain format, such as a Microsoft Word document or a Portable Document Format (PDF). In response to the user selecting the selectable user interface element 620, the social networking system 210 may display a window (not shown) in which a user may select a file containing a resume to upload. After the user has entered contact information and uploaded a resume, the user may submit the entered contact information and the uploaded resume file to the social networking system 210 for processing using a selectable user interface element 630 (e.g., a "SUBMIT APPLICATION" button). The entered contact information and the uploaded resume file may form a job application of the user, who is now recognized by the social networking system 210 as an applicant for the job posting based on the submission of the entered contact information and the uploaded resume. The uploaded resume may be stored in the database(s) 360 in association with the user to whom the uploaded resume corresponds.

In some example embodiments, the identification module 310 is configured to identify a plurality of job postings published on an online service as corresponding to a type of job based on corresponding feature data of each one of the plurality of job postings. In some example embodiments, the corresponding feature data of each one of the plurality of job postings comprises at least one of a role within an organization, a seniority level, an industry, and a job function. However, other types of feature data are also within the scope of the present disclosure.

In some example embodiments, the identifying of the plurality of jobs comprises receiving a plurality of job postings published on an online service, determining that a subset of the plurality of the job postings satisfies a similarity criteria based on corresponding feature data of each job posting in the subset, with the subset comprising multiple job postings, and selecting the subset of the plurality of job postings based on the determining that the subset satisfies the similarity criteria. In some example embodiments, the receiving the plurality of job postings comprises accessing user activity data of a user stored in a database in association with a profile of the user, determining that the user activity data indicates an interest by the user in the plurality of job postings, and selecting the plurality of job postings based on the determining that the user activity data indicates an interest by the first user in the plurality of job openings. The user activity data may comprise at least one of viewing a job listing and submitting an application for a job listing. However, other types of user activity data are also within the scope of the present disclosure.

In some example embodiments, the determining that the subset of the plurality of the job postings satisfies the similarity criteria comprises using at least one filter to determine that the corresponding feature data of each job posting in the subset of the plurality of job postings matches a filter feature data. In one example, the filter feature data identifies "COMPUTER SOFTWARE" as the industry data and the similarity criteria requires that the corresponding industry data of each job posting in the subset of the plurality of job postings includes "COMPUTER SOFTWARE." In some example embodiments, the determining that the subset of the plurality of the job postings satisfies the similarity criteria comprises using semantic matching to determine that the corresponding feature data of each job posting in the subset of the plurality of job postings comprises a similar meaning as the corresponding feature data of the other job postings in the subset of the plurality of job postings, rather than requiring an exact match.

In some example embodiments, the extraction module 320 is configured to extract a plurality of phrases from the identified plurality of job postings based on a corresponding relevancy measurement and a corresponding diversity measurement for each one of the plurality of phrases. The relevancy measurement comprises a measure of relevance of the corresponding phrase to the type of job, and the diversity measurement comprises a measure of distinction between the corresponding phrase and other phrases in the plurality of phrases.

In some example embodiments, the extracting of the plurality of phrases comprises receiving a plurality of phrases for a type of job. The receiving of the plurality of phrases for the type of job may comprise selecting sentences from one or more job listings of the type of job based on the selected sentences being determined to comprise role-dependent information that corresponds to a role in an organization, and extracting noun phrases from the selected sentences, with the extracted noun phrases being included in the plurality of phrases, and a remaining portion of the selected sentences other than the extracted noun phrases being omitted from the plurality of phrases. In some example embodiments, the receiving of the plurality of phrases for the type of job comprises extracting the plurality of phrases from one or more job listings of the type of job.

In some example embodiments, the extracting of the plurality of phrases further comprises selecting a group of phrases from the plurality of phrases based on a corresponding relevancy measurement and a corresponding diversity measurement for each phrase in the selected group of phrases. The relevancy measurement comprises a measure of relevance of the corresponding selected phrase in the selected group of phrases to the type of job, and the diversity measurement comprises a measure of distinction between each phrase in the selected group of phrases and other phrases in the selected group of the phrases. In some example embodiments, the selecting the group of phrases from the plurality of phrases comprises generating the corresponding relevance measurement for each one of the plurality of phrases, ranking the plurality of phrases based on their corresponding relevance measurements, selecting a first phrase of the plurality of phrases for inclusion in the group of phrases based on the first phrase having a highest ranking amongst the plurality of phrases, identifying a second phrase of the plurality of phrases based on the second phrase having a second highest ranking amongst the plurality of phrases, determining a diversity measurement of the second phrase indicating the measure of distinction between the second phrase and the first phrase, and determining whether or not to include the second phrase in the group of phrases based on the determined diversity measurement of the second phrase.

In some example embodiments, the placement module 330 is configured to, for each one of the extracted plurality of phrases, determine a corresponding section of a page of a user to suggest for placement of the extracted phrase using a placement classifier. The placement classifier is configured to determine the corresponding section based on the extracted phrase. In some example embodiments, the plurality of sections comprises at least one of a summary section, a skill section, a work experience section, and an education section. However, other types of sections are also within the scope of the present disclosure. In some example embodiments, the page comprises a profile page of the user that is associated with a profile of the user, as discussed above with respect to FIG. 4, or a resume of the user that is included in an application to a job posting via the online service, as discussed above with respect to FIG. 6. However, other types of pages of the user are also within the scope of the present disclosure. In some example embodiments, for each one of the extracted plurality of phrases, the corresponding section of the page comprises one of a summary section of a profile, a work experience section of the profile, an education section of the profile, a skills section of the profile, and an accomplishments section of the profile. However, other types of sections of the page are also within the scope of the present disclosure.

In some example embodiments, the suggestion module 340 is configured to, for each one of the extracted plurality of phrases, generate a corresponding recommendation for the page of the user based on the extracted phrase and the determined corresponding section of the extracted phrase. The corresponding recommendation may comprise a suggested addition of the corresponding extracted phrase to the corresponding section of the page of the user. However, other types of recommendations are also within the scope of the present disclosure.

In some example embodiments, the generating of the corresponding recommendation comprises accessing a profile of a user of an online service stored in a database of the online service, and generating a suggestion for adding a measurable accomplishment to a particular section of a page of the user based on profile data of the accessed profile using a neural network model. The neural network model is configured to identify the measurable accomplishment based on the profile data of the accessed profile. In some example embodiments, the profile data comprises a current job title of the user and textual data distinct from the current job title, and the neural network model is configured to identify the measurable accomplishment based on the current job title of the user and the textual data. The textual data may comprise text from a summary section of the profile of the user or text from a work experience section of the profile of the user, and the measurable accomplishment may comprise at least a portion of the textual data. However, other configurations of the textual data and the measurable accomplishment are also within the scope of the present disclosure. In some example embodiments, the profile data further comprises at least one of a seniority level of the first user, a location of the first user, an industry of the first user, and a role of the first user within an organization. However, other types of profile data are also within the scope of the present disclosure.

In some example embodiments, the suggestion module 340 is further configured to cause the generated recommendations to be displayed on a computing device of the user. In some example embodiments, the suggestion module 340 causes a corresponding selectable user interface element to be displayed in association with each one of the generated recommendations. FIG. 7 illustrates a GUI 700 in which recommendations 710 and 720 for optimizing a page of a user are displayed, in accordance with an example embodiment. In FIG. 710, The recommendations 710 comprise suggestions of changes to be made to the page of the user. These recommendations 710 may apply to different aspects of the page. For example, the recommendation 710-1 in FIG. 7 comprises a suggestion to improve the formatting of the summary section of the user's profile page by using bullet points to improve readability, and the recommendation 710-2 in FIG. 7 comprises a suggestion to add certain types of measurable results to the summary section of the user's profile page.

In some example embodiments, the suggestion to add measurable results to the page of the user comprises one or more indications 712 of types or areas of measurable results add to the page of the user based on the determination of what type of job the user in interested in, such as the type of role or the type of industry the user is interested in. For example, in FIG. 7, the recommendation 710-2 comprises indications 712-1 and 712-2 that the user should add measurable results in the areas of leadership and A/B testing, respectively, to the page of the user in order to attract recruiters of senior software engineers. Other types of recommendations 710 are also within the scope of the present disclosure. Examples of other types of recommendations 710 include, but are not limited to, a recommendation to edit the page so that the description section of the page and the title section of the page are more closely connected (e.g., the content of the description in consistent with and includes text from the title).

In FIG. 7, the recommendations 720 comprise suggestions to add particular phrases to the page of the user. For example, the recommendations 720-1, 720-2, 720-3, 72-4, and 720-5 in FIG. 7 include suggestions to add particular phrases to the page of the user. These suggestions may comprise indications of an area or topic to which the suggestion applies (e.g., leadership, A/B testing, collaboration, engineer, user research), how important the area or topic is to a type of job that the user is interested in (e.g., high importance, medium importance), and the particular suggested phrase (e.g., "Coached my team on a business strategy").

In the example shown in FIG. 7, the recommendations 720-1, 720-2, 720-3, 720-4, and 720-5 have corresponding selectable user interface elements 725-1, 725-2, 725-3, 725-4, and 725-5, respectively, displayed in association with the recommendations 720-1, 720-2, 720-3, 720-4, and 720-5. The selectable user interface elements 725 are configured to, in response to their selection (e.g., being clicked on, being tapped on) by the user, cause the phrase corresponding to the selected user interface element 725 to be displayed in a text field of the determined corresponding section of the phrase on the computing device of the user.

Figure 8:
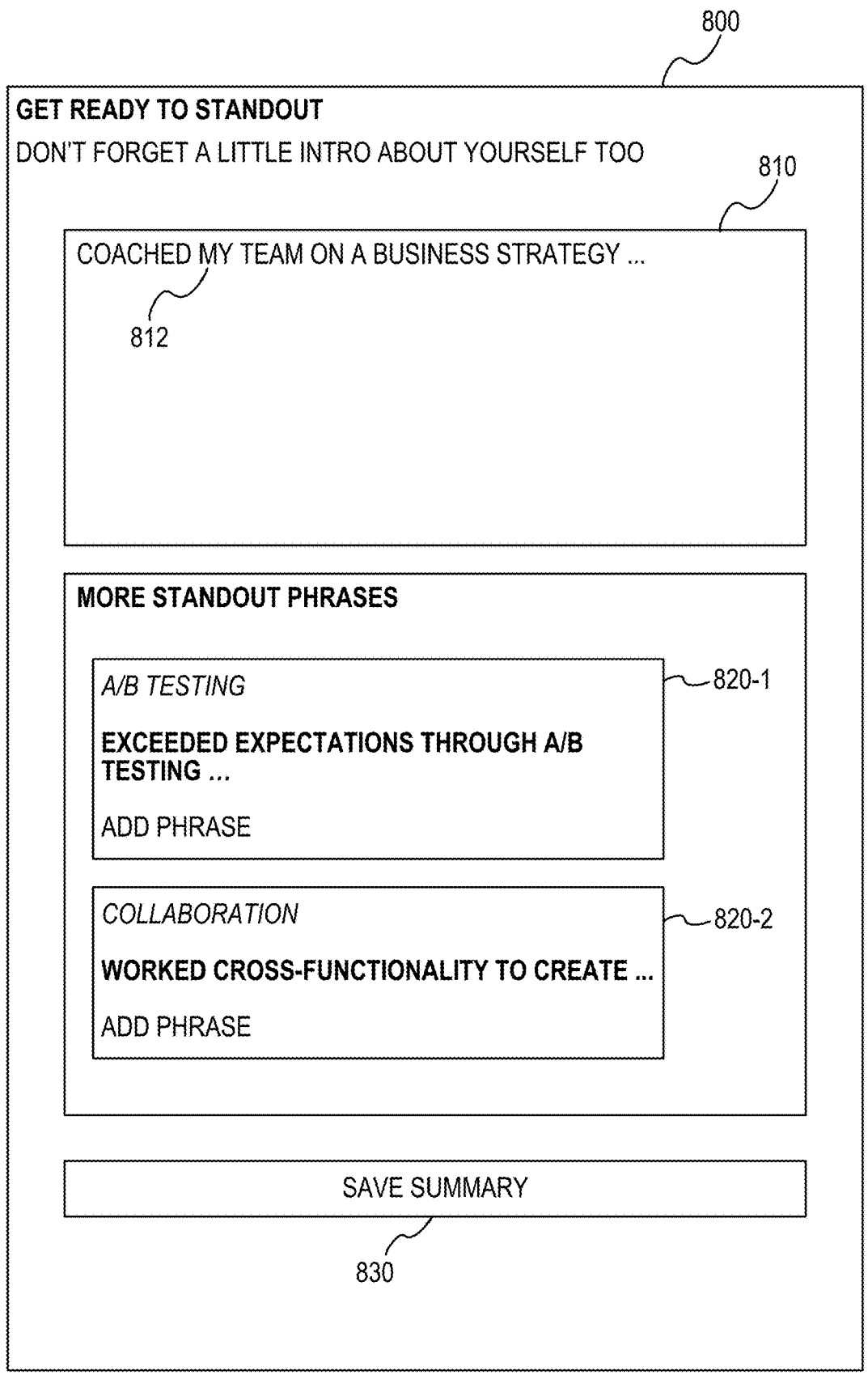
FIG. 8 illustrates a GUI in which a user can save user-entered text to a section of a page of the user, in accordance with an example embodiment.

FIG. 8 illustrates a GUI 800 in which the user can save user-entered text to a section of a page of the user, in accordance with an example embodiment. In FIG. 8, the user has selected the selectable user interface element 725-1 in FIG. 7, thereby triggering, or otherwise causing, the phrase 812 corresponding to the selected user interface element 725-1 to be displayed in a text field 810 of the determined corresponding section of the phrase 812 on the computing device of the user. In some example embodiments, the text field 810 is configured to receive user-entered text, such that the user may add and remove text from the text field 810. The phrase 812 may comprise template language, such that one or more portions of the phrase are populated by a placeholder in which the user is encouraged to enter text. For example, although the phrase 812 shown in FIG. 8 reads "COACHED MY TEAM ON A BUSINESS STRATEGY." the phrase 812 may alternatively read "COACHED X ON Y" with "X" and "Y" serving as placeholders, or may read "COACHED __ ON __" with "__" serving as placeholders. The GUI 800 may also display additional phrase recommendations 820. These additional phrase recommendations 820 may correspond to a select number of recommendations 720 in FIG. 7 that were not yet selected by the user. In the example shown in FIG. 8, the GUI 800 displays additional phrase recommendation 820-1, which corresponds to unselected recommendation 720-1 in FIG. 7, and additional phrase recommendation 820-2, which corresponds to unselected recommendation 720-3 in FIG. 7.

In some example embodiments, the GUI 800 also comprises a selectable user interface element 830 configured to, in response to its selection by the user, trigger a saving of the user-entered text that is in the text field 810 to the determined corresponding section of the page of the user. The user-entered text comprises at least a portion of the phrase 812 corresponding to the selected user interface element 725. The suggestion module 340 is configured to store the user-entered text, which includes at least a portion of the phrase 812, in the database(s) 360 in association with the determined corresponding section of the page of the user in response to, or otherwise based on, the instruction by the user via the selection of the selectable user interface element 830 to save the user-entered text in the text field 810 to the section of the page of the user. As a result of this storing of the user-entered text in the database(s) 360 in association with the corresponding section of the page of the user, the social networking system 210 may, in response to receiving a request to view the page of the user from another computing device of another user, cause the page of the user to be displayed on the other computing device of the other user, with the page comprising the user-entered text including at least a portion of the phrase 812.

In some example embodiments, the suggestion module 340 is configured to access a profile of the user stored in the database(s) 350, generate a suggestion for adding a measurable accomplishment to a particular section of the profile of the user (or some other type of recommendation 710 or 720) based on profile data of the accessed profile using a neural network model, and cause the generated suggestion for adding the measurable accomplishment to be displayed on the first computing device of the user. The neural network model may be configured to identify the measurable accomplishment within the profile data of the accessed profile.

In some example embodiments, the machine learning module 350 is configured to train and retrain a classifier of the neural network model to identify measurable results of the user, such as measurable results indicated in the accessed profile data. One technical challenge in training the classifier is in providing enough training data to effectively train the classifier so that the classifier is sufficiently accurate in its predictions, as well as to eliminate as much confusion in the predictions of the classifier. In some example embodiments, the machine learning module 350 uses training data that includes phrases in the form of vectors. The machine learning module 350 may train the classifier in phases. For example, in a first phase, one-thousand examples may be labelled and used as training data in training the classifier. The trained classifier is then used to sample a million examples to see where the classifier is least confident, which can be evaluated using the likelihood values of the predictions for the sampled examples. If the likelihood value of a sampled example is very high (e.g., above 0.90) or very low (e.g., below 0.10), then the machine learning module 350 knows that the classifier has a high level of confidence in its classification of the sampled example. However, when the likelihood value of the sampled example is around a middle (e.g., between 0.35 and 0.65) or the classifier generates significantly different likelihood values for two phrases that are very similar except for minor differences, then the machine learning module 350 knows that the classifier is confused. In some example embodiments, the machine learning module 350 is configured to select the most confused examples to get labeled in the next phase of training the classifier (e.g., the retraining of the classifier).

In some example embodiments, the machine learning module 350 is configured to train a classifier using a first plurality of training data, with each one of the first plurality of training data comprising profile data of the user textual data distinct from the profile data, and a label indicating whether or not the one of the first plurality of training data qualifies as a measurable accomplishment. In some example embodiments, the machine learning module 350 is further configured to, for each one of a first plurality of sample data, generate a corresponding likelihood value indicating a likelihood that the one of the first plurality of sample data corresponds to a measurable accomplishment using the trained classifier, with each one of the first plurality of sample data comprising profile data of a user and textual data distinct from the profile data. In some example embodiments, the machine learning module 350 is further configured to identify a portion of the first plurality of sample data as corresponding to confused predictions based on the corresponding likelihood values of the portion of the first plurality of sample data and a confusion criteria, and then retrain the trained classifier using a second plurality of training data, with the second plurality of training data including the portion of the first plurality of sample data based on the identifying of the portion of the first plurality of sample data as corresponding to confused prediction. In some example embodiments, each one of the second plurality of training data comprises profile data of a user, textual data distinct from the profile data, and a label indicating whether or not the one of the second plurality of training data qualifies as a measurable accomplishment.

In some example embodiments, the machine learning module 350 is configured to repeat the operations of generating corresponding likelihood values for sample data, identifying a portion of the sampled data as corresponding to confused predictions based on the corresponding likelihood values, and retrain the classifier using the identified portion of the sampled data until the portion of sample data being identified by the machine learning module 350 as corresponding to confused predictions is below a threshold value (e.g., until less than 2% of the samples data is identified as corresponding to confused predictions).

In some example embodiments, the confusion criteria comprises the corresponding likelihood value being below a minimum threshold value and above a maximum threshold value. For example, the confusion criteria may comprise the corresponding likelihood value being between below 65% and above 35%, which would be interpreted by the machine learning module 350 as the classifier being confused, as the likelihood value is not very high and not very low.

In some example embodiments, the confusion criteria comprises two conditions that address the situation in the classifier has generated significantly different likelihood values for two very similar, but not identical, phrases. The first condition is that a difference between the corresponding likelihood value of one of the portion of the plurality of sample data and the corresponding likelihood value of another one of the portion of the plurality of sample data is greater than a threshold difference value. The second condition is that a difference between the textual data of the one of the portion of the plurality of sample data and the textual data of the other one of the portion of the plurality of sample data is less than a threshold textual difference.

Figure 9:
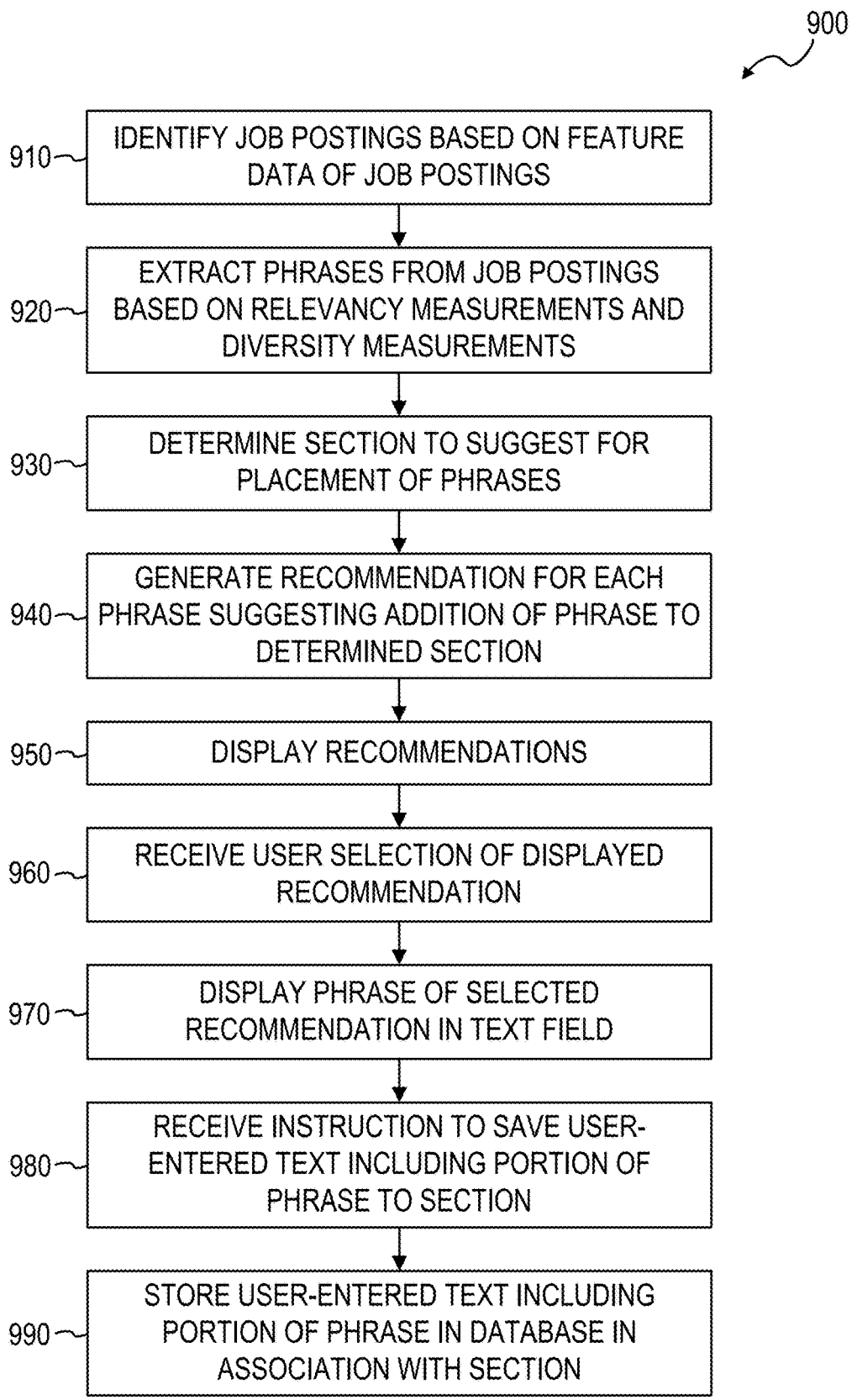
FIG. 9 is a flowchart illustrating a method of providing a recommendations for optimizing a page of a user, in accordance with an example embodiment.

FIG. 9 is a flowchart illustrating a method 900 of providing a recommendations for optimizing a page of a user, in accordance with an example embodiment. The method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the optimization system 216 of FIG. 3, or any combination of one or more of its modules, as described above.

At operation 910, the optimization system 216 identifies a plurality of job postings published on an online service as corresponding to a type of job based on corresponding feature data of each one of the plurality of job postings. In some example embodiments, the corresponding feature data of each one of the plurality of job postings comprises at least one of a role within an organization, a seniority level, an industry, and a job function. Other types of feature data are also within the scope of the present disclosure.

At operation 920, the optimization system 216 extracts a plurality of phrases from the identified plurality of job postings based on a corresponding relevancy measurement and a corresponding diversity measurement for each one of the plurality of phrases. In some example embodiments, the relevancy measurement comprises a measure of relevance of the corresponding phrase to the type of job, and the diversity measurement comprising a measure of distinction between the corresponding phrase and other phrases in the plurality of phrases. In some example embodiments, for each one of the extracted plurality of phrases, the corresponding section of the page comprises one of a summary section of a profile, a work experience section of the profile, an education section of the profile, a skills section of the profile, and an accomplishments section of the profile. Other types of sections of the page are also within the scope of the present disclosure.

At operation 930, the optimization system 216, for each one of the extracted plurality of phrases, determines a corresponding section of a page of a first user to suggest for placement of the extracted phrase using a placement classifier. In some example embodiments, the placement classifier is configured to determine the corresponding section based on the extracted phrase.

In some example embodiments, the page comprises a profile page of the first user that is associated with a profile of the first user, with the profile being stored in a database of the online service in association with a profile of the first user. In some example embodiments, the page comprises a resume of the first user that is included in an application to a job posting via the online service. Other types of pages are also within the scope of the present disclosure.

At operation 940, the optimization system 216, for each one of the extracted plurality of phrases, generates a corresponding recommendation for the page of the first user based on the extracted phrase and the determined corresponding section of the extracted phrase. In some example embodiments, the corresponding recommendation comprises a suggested addition of the corresponding extracted phrase to the corresponding section of the page of the first user.

At operation 950, the optimization system 216 causes the generated recommendations to be displayed on a first computing device of the first user. In some example embodiments, the causing the generated recommendations to be displayed on the first computing device of the first user comprises causing a corresponding selectable user interface element to be displayed in association with each one of the generated recommendations.

At operation 960, the optimization system 216 receives a user selection of the corresponding selectable user interface element of one of the displayed recommendations from the first computing device of the first user At operation 970, the optimization system 216, in response to the user selection, causes the extracted phrase corresponding to the selected user interface element to be displayed in a text field of the determined corresponding section of the extracted phrase on the first computing device of the first user. In some example embodiments, the text field is configured to receive user-entered text.

At operation 980, the optimization system 216 receives an instruction from the first computing device of the first user to save the user-entered text that is in the text field to the determined corresponding section of the page of the rust user. In some example embodiments, the user-entered text comprises at least a portion of the extracted phrase corresponding to the selected user interface element.

At operation 990, the optimization system 216 stores the user-entered text including the at least a portion of the extracted phrase in a database in association with the determined corresponding section of the page of the first user in response to, or otherwise based on, the instruction from the user received at operation 980.

It is contemplated that any of the other features described within the present disclosure can be incorporated into the method 900.

Figure 10:
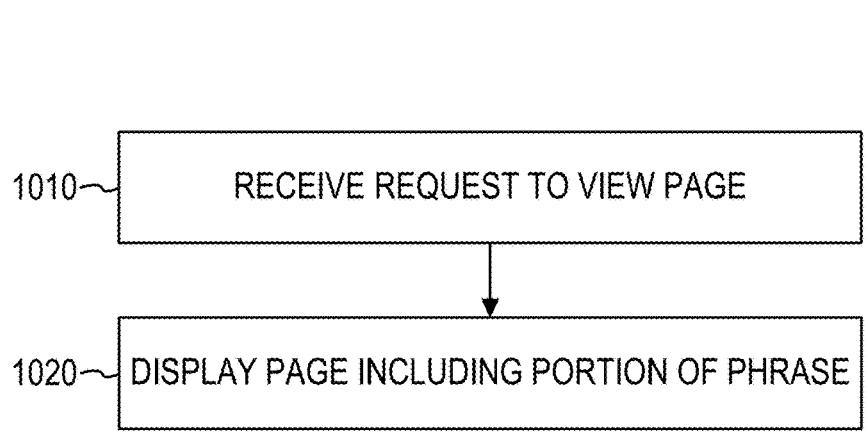
FIG. 10 is a flowchart illustrating a method of displaying a page of a user, in accordance with an example embodiment.

FIG. 10 is a flowchart illustrating a method 1000 of displaying a page of a user, in accordance with an example embodiment. The method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the optimization system 216 of FIG. 3, or any combination of one or more of its modules, as described above.

In some example embodiments, the method 1000 comprises operations 1010 and 1020, which are performed subsequent to operation 990 of the method 900 in FIG. 9. At operation 1010, the optimization system 216 receives a request to view the page of the first user from a second computing device of a second user (e.g., a different user than the user to whom the page corresponds). At operation 1020, the optimization system 216 causes the page of the first user to be displayed on the second computing device of the second user in response to, or otherwise base on, the request received at operation 1010. In some example embodiments, the page comprises the user-entered text including the at least a portion of the extracted phrase that was stored at operation 990 of the method 900 in FIG. 9.

It is contemplated that any of the other features described within the present disclosure can be incorporated into the method 1000.

Figure 11:
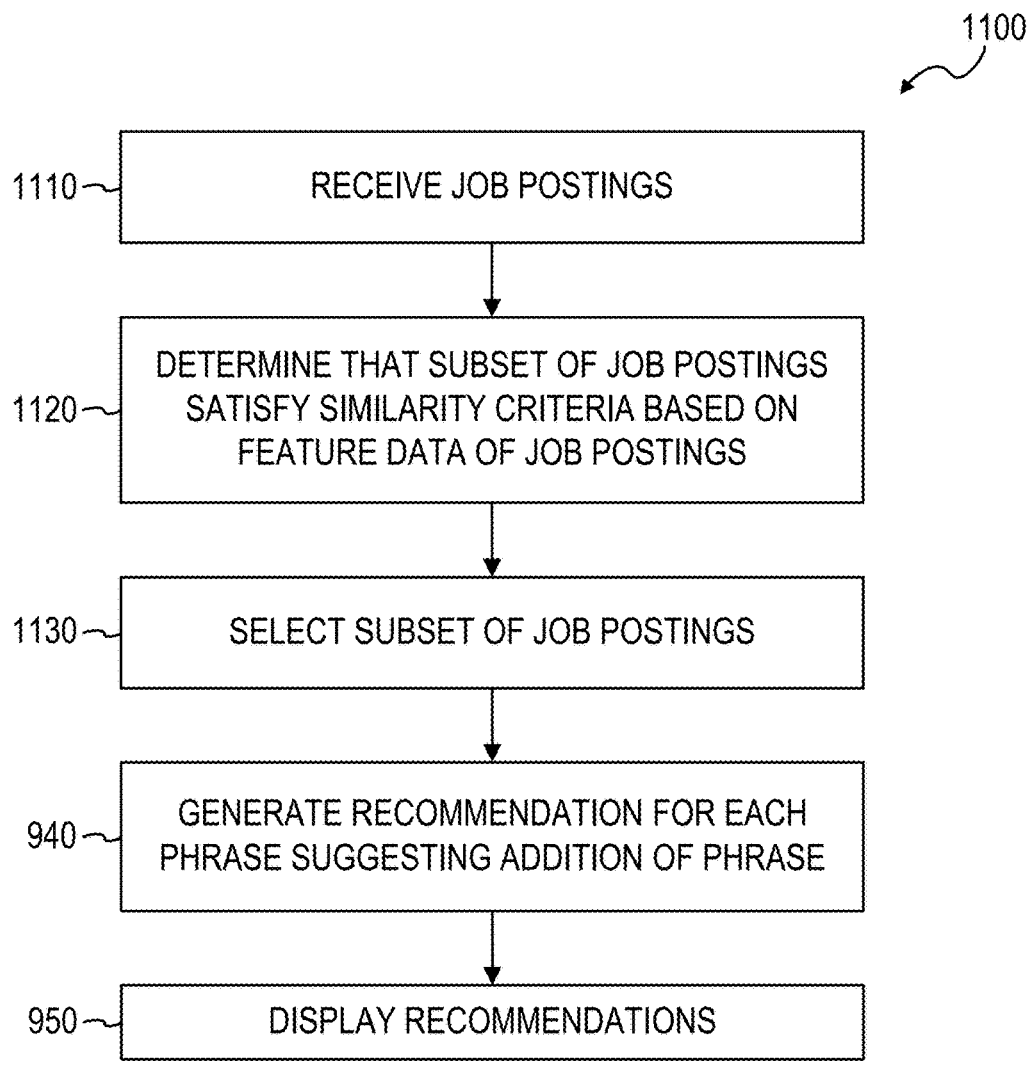
FIG. 11 is a flowchart illustrating another method of providing a recommendations for optimizing a page of a user, in accordance with an example embodiment.

FIG. 11 is a flowchart illustrating another method 1100 of providing a recommendations for optimizing a page of a user, in accordance with an example embodiment. The method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the optimization system 216 of FIG. 3, or any combination of one or more of its modules, as described above. In some example embodiments, the method 1100 comprises operations 1110, 1120, and 1130, which are performed prior to operation 940 of the method 900 in FIG. 9.

At operation 1110, the optimization system 216 receives a plurality of job postings published on an online service. In some example embodiments, the receiving the plurality of job postings comprises accessing user activity data of the first user stored in a database in association with a profile of the first user, determining that the user activity data indicates an interest by the first user in the plurality of job postings, and selecting the plurality of job postings based on the determining that the user activity data indicates an interest by the first user in the plurality of job openings. In some example embodiments, the user activity data comprises at least one of viewing a job listing and submitting an application for a job listing. Other types of activity data are also within the scope of the present disclosure.

At operation 1120, the optimization system 216 determines that a subset of the plurality of the job postings satisfies a similarity criteria based on corresponding feature data of each job posting in the subset, the subset comprising multiple job postings. In some example embodiments, the determining that the subset of the plurality of the job postings satisfies the similarity criteria comprises using at least one filter to determine that the corresponding feature data of each job posting in the subset of the plurality of job postings matches a filter feature data. In some example embodiments, the determining that the subset of the plurality of the job postings satisfies the similarity criteria comprises using semantic matching to determine that the corresponding feature data of each job posting in the subset of the plurality of job postings comprises a similar meaning as the corresponding feature data of the other job postings in the subset of the plurality of job postings.

At operation 1130, the optimization system 216 selects the subset of the plurality of job postings based on the determination at operation 1120 that the subset satisfies the similarity criteria. The method 1100 may then proceed to operation 940, previously discussed with respect to the method 900 of FIG. 9, in which the optimization system 216 generates a recommendation for a page of a first user based on the selected subset of job postings, with the recommendation comprising a suggested addition of content to the page of the first user, and then operation 950, previously discussed with respect to the method 900 of FIG. 9, in which the optimization system 216 causes the generated recommendation for the page of the first user to be displayed on a computing device of the first user.

It is contemplated that any of the other features described within the present disclosure can be incorporated into the method 1100.

Figure 12:
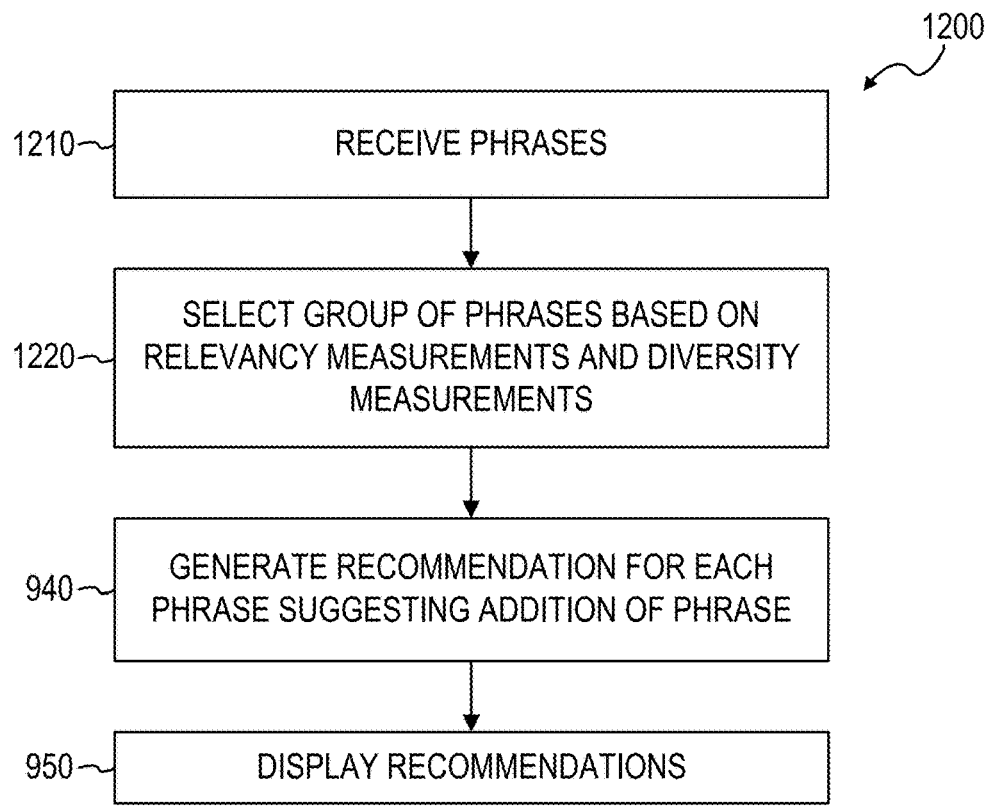
FIG. 12 is a flowchart illustrating yet another method of providing a recommendations for optimizing a page of a user, in accordance with an example embodiment.

FIG. 12 is a flowchart illustrating yet another method 1200 of providing a recommendations for optimizing a page of a user, in accordance with an example embodiment. The method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by the optimization system 216 of FIG. 3, or any combination of one or more of its modules, as described above. In some example embodiments, the method 1200 comprises operations 1210 and 1220, which are performed prior to operation 940 of the method 900 in FIG. 9.

At operation 1210, the optimization system 216 receives a plurality of phrases for a type of job. In some example embodiments, the receiving the plurality of phrases for the type of job comprises selecting sentences from one or more job listings of the type of job based on the selected sentences being determined to comprise role-dependent information that corresponds to a role in an organization, and extracting noun phrases from the selected sentences. In some example embodiments, the extracted noun phrases are included in the plurality of phrases, and a remaining portion of the selected sentences other than the extracted noun phrases are omitted from the plurality of phrases. In some example embodiments, the receiving the plurality of phrases for the type of job comprises extracting the plurality of phrases from one or more job listings of the type of job.

At operation 1220, the optimization system 216 selects a group of phrases from the plurality of phrases based on a corresponding relevancy measurement and a corresponding diversity measurement for each phrase in the selected group of phrases. In some example embodiments, the relevancy measurement comprises a measure of relevance of the corresponding selected phrase in the selected group of phrases to the type of job, and the diversity measurement comprises a measure of distinction between each phrase in the selected group of phrases and other phrases in the selected group of the phrases. In some example embodiments, the selecting the group of phrases from the plurality of phrases comprises generating the corresponding relevance measurement for each one of the plurality of phrases, ranking the plurality of phrases based on their corresponding relevance measurements, selecting a first phrase of the plurality of phrases for inclusion in the group of phrases based on the first phrase having a highest ranking amongst the plurality of phrases, identifying a second phrase of the plurality of phrases based on the second phrase having a second highest ranking amongst the plurality of phrases, determining a diversity measurement of the second phrase indicating the measure of distinction between the second phrase and the first phrase, and determining whether or not to include the second phrase in the group of phrases based on the determined diversity measurement of the second phrase.

The method 1200 may then proceed to operation 940, previously discussed with respect to the method 900 of FIG. 9, in which the optimization system 216 generates a recommendation for a page of a first user based on the selected subset of job postings, with the recommendation comprising a suggested addition of content to the page of the first user, and then operation 950, previously discussed with respect to the method 900 of FIG. 9, in which the optimization system 216 causes the generated recommendation for the page of the first user to be displayed on a computing device of the first user.

It is contemplated that any of the other features described within the present disclosure can be incorporated into the method 1200.

Figure 13:
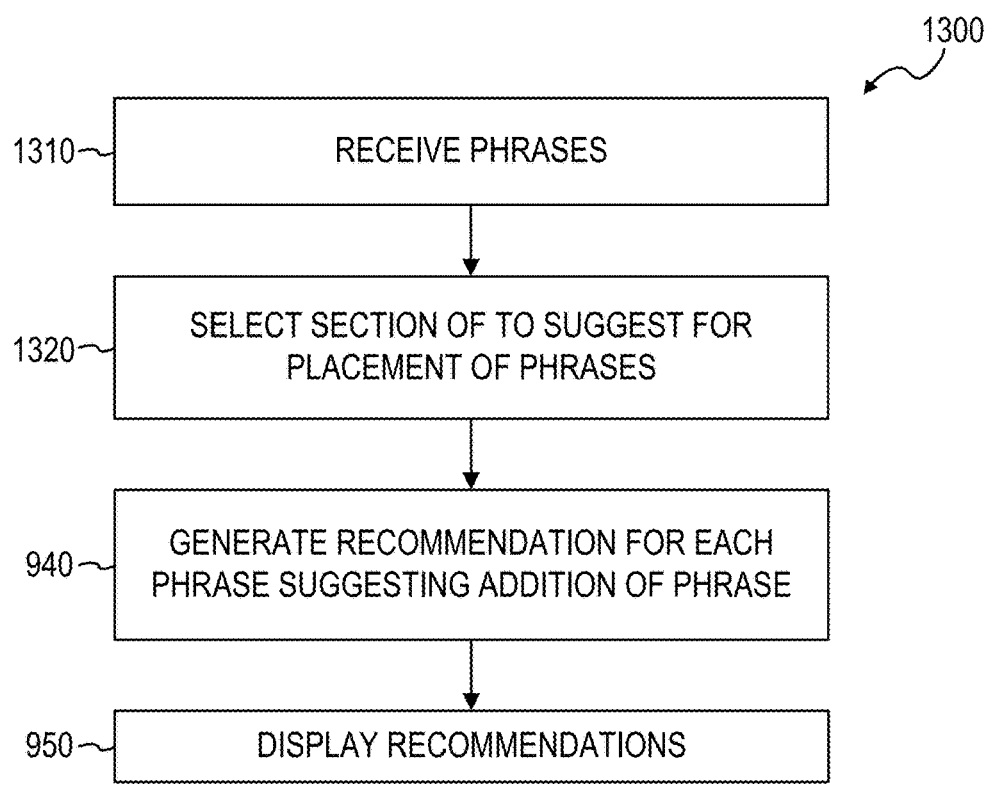
FIG. 13 is a flowchart illustrating yet another method of providing a recommendations for optimizing a page of a user, in accordance with an example embodiment.

FIG. 13 is a flowchart illustrating yet another method 1300 of providing a recommendations for optimizing a page of a user, in accordance with an example embodiment. The method 1300 can be performed by processing logic that can comprise hardware (e.g., circuitry, dedicated logic, programmable logic, microcode, etc.), software (e.g., instructions run on a processing device), or a combination thereof. In one implementation, the method 1300 is performed by the optimization system 216 of FIG. 3, or any combination of one or more of its modules, as described above. In some example embodiments, the method 1300 comprises operations 1310 and 1320, which are performed prior to operation 940 of the method 900 in FIG. 9.

At operation 1310, the optimization system 216 receives a plurality of phrases. At operation 1320, the optimization system 216, for each one of the plurality of phrases, selects a corresponding section of a page of a first user to suggest for placement of the phrase from amongst a plurality of sections using a placement classifier. In some example embodiments, the placement classifier is configured to determine the corresponding section based on the phrase. In some example embodiments, the plurality of sections comprises at least one of a summary section, a skill section, a work experience section, and an education section. Other types of sections are also within the scope of the present disclosure.

The method 1300 may then proceed to operation 940, previously discussed with respect to the method 900 of FIG. 9, in which the optimization system 216 generates a recommendation for a page of a first user based on the selected subset of job postings, with the recommendation comprising a suggested addition of content to the page of the first user, and then operation 950, previously discussed with respect to the method 900 of FIG. 9, in which the optimization system 216 causes the generated recommendation for the page of the first user to be displayed on a computing device of the first user.

It is contemplated that any of the other features described within the present disclosure can be incorporated into the method 1300.

Figure 14:
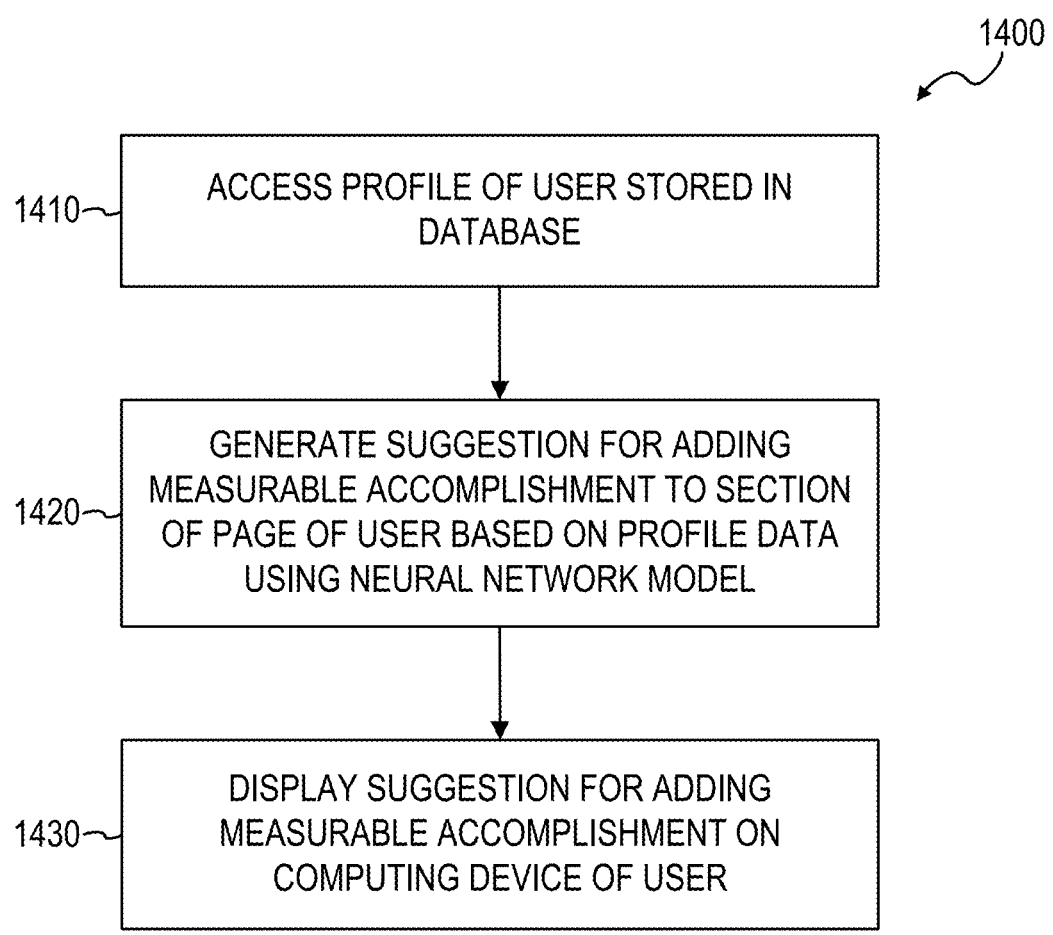
FIG. 14 is a flowchart illustrating a method of providing a suggestion for optimizing a page of a user, in accordance with an example embodiment.

FIG. 14 is a flowchart illustrating a method 1400 of providing a suggestion for optimizing a page of a user, in accordance with an example embodiment. The method 1400 can be performed by processing logic that can comprise hardware (e.g., circuitry, dedicated logic, programmable logic, microcode, etc.), software (e.g., instructions run on a processing device), or a combination thereof. In one implementation, the method 1400 is performed by the optimization system 216 of FIG. 3, or any combination of one or more of its modules, as described above.

At operation 1410, the optimization system 216 accesses a profile of a first user of an online service stored in a database of the online service. At operation 1420, the optimization system 216 generates a suggestion for adding a measurable accomplishment to a particular section of a page of the first user based on profile data of the accessed profile using a neural network model, the neural network model being configured to identify the measurable accomplishment based on the profile data of the accessed profile. At operation 1430, the optimization system 216 causes the generated suggestion for adding the measurable accomplishment to be displayed on a first computing device of the first user.

In some example embodiments, the profile data comprises a current job title of the first user and textual data distinct from the current job title, and the neural network model is configured to identify the measurable accomplishment based on the current job title of the first user and the textual data. In some example embodiments, the textual data comprises text from a summary section of the profile of the first user or text from a work experience section of the profile of the first user, and the measurable accomplishment comprises at least a portion of the textual data. In some example embodiments, the profile data further comprises at least one of a seniority level of the first user, a location of the first user, an industry of the first user, and a role of the first user within an organization.

In some example embodiments, operation 1430 comprises causing a selectable user interface element to be displayed in association with the generated suggestion. In some example embodiments, the optimization system 216 receives a user selection of the selectable user interface element of one of the displayed suggestion from the first computing device of the first user, and causes the measurable accomplishment to be displayed in a text field of the particular section of the page of the first user on the first computing device of the first user in response to the user selection. In some example embodiments, the optimization system 216 is further configured to receive an instruction from the first computing device of the first user to save the user-entered text that is in the text field to the particular section of the page of the first user with the user-entered text comprising at least a portion of the measurable accomplishment, and to store the user-entered text including the at least a portion of the measurable accomplishment in a database in association with the particular section of the page of the first user. In some example embodiments, the particular section of the page comprises a summary section of the page or a work experience section of the page. Other types of sections of the page are also within the scope of the present disclosure.

It is contemplated that any of the other features described within the present disclosure can be incorporated into the method 1400.

Figure 15:
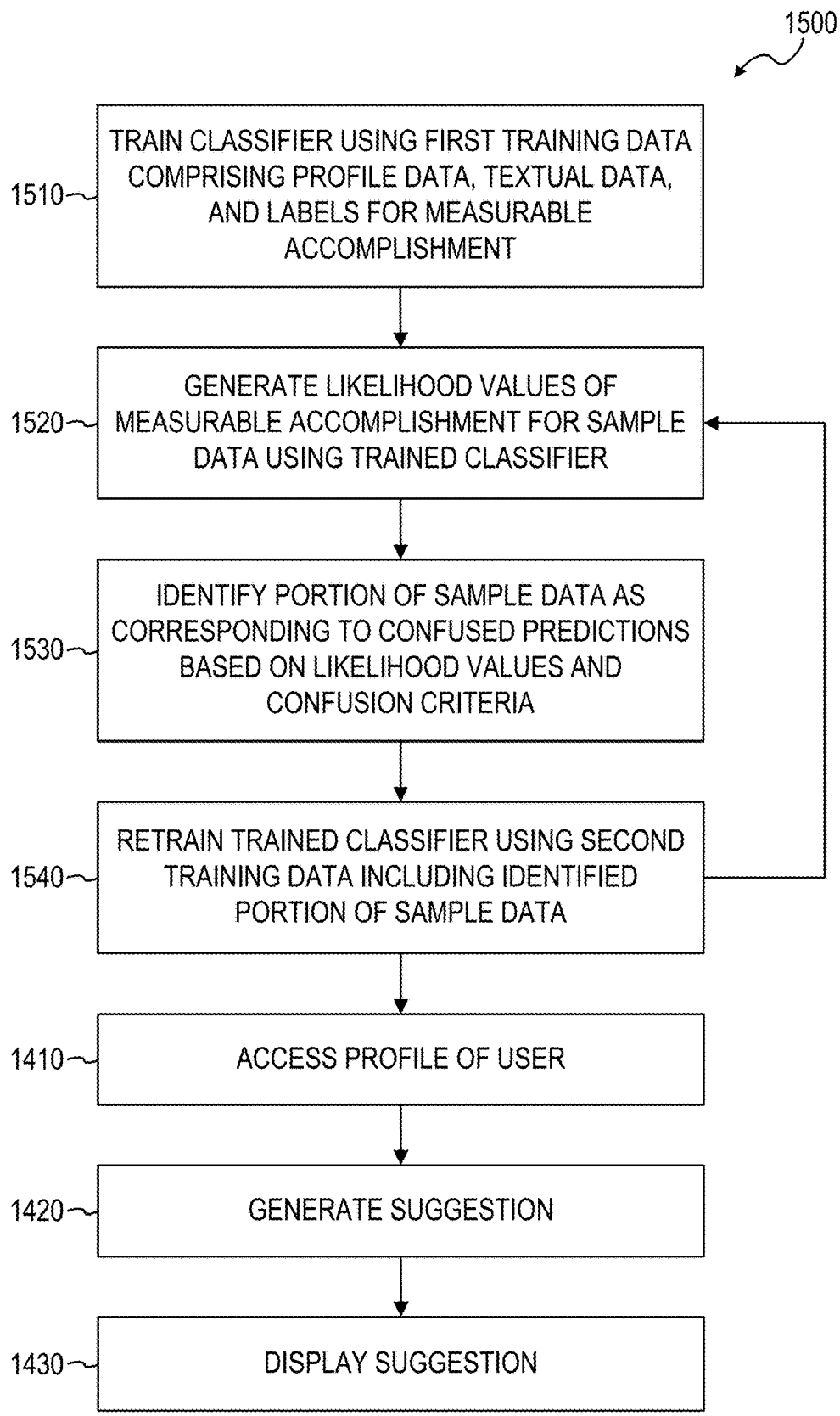
FIG. 15 is a flowchart illustrating a method of training a classifier to be used in providing a suggestion for optimizing a page of a user, in accordance with an example embodiment.

FIG. 15 is a flowchart illustrating a method 1500 of training a classifier to be used in providing a suggestion for optimizing a page of a user, in accordance with an example embodiment. The method 1500 can be performed by processing logic that can comprise hardware (e.g., circuitry, dedicated logic, programmable logic, microcode, etc.), software (e.g., instructions run on a processing device), or a combination thereof. In one implementation, the method 1500 is performed by the optimization system 216 of FIG. 3, or any combination of one or more of its modules, as described above. In some example embodiments, the method 1500 comprises operations 1510, 1520, 1530, and 1540, which are performed prior to operation 14100 of the method 1410 in FIG. 14.

At operation 1510, the optimization system 216 trains a classifier using a first plurality of training data. In some example embodiments, each one of the first plurality of training data comprises profile data of a user, textual data distinct from the profile data, and a label indicating whether or not the one of the first plurality of training data qualifies as a measurable accomplishment.

At operation 1520, the optimization system 216, for each one of a first plurality of sample data, generates a corresponding likelihood value indicating a likelihood that the one of the first plurality of sample data corresponds to a measurable accomplishment using the trained classifier. In some example embodiments, each one of the first plurality of sample data comprises profile data of a user and textual data distinct from the profile data.

At operation 1530, the optimization system 216 identifies a portion of the first plurality of sample data as corresponding to confused predictions based on the corresponding likelihood values of the portion of the first plurality of sample data and a confusion criteria. In some example embodiments, the confusion criteria comprises the corresponding likelihood value being below a minimum threshold value and above a maximum threshold value. In some example embodiments, the confusion criteria comprises a first condition and a second condition. The first condition comprises a difference between the corresponding likelihood value of one of the portion of the plurality of sample data and the corresponding likelihood value of another one of the portion of the plurality of sample data being greater than a threshold difference value, and the second condition comprising a difference between the textual data of the one of the portion of the plurality of sample data and the textual data of the other one of the portion of the plurality of sample data being less than a threshold textual difference.

At operation 1540, the optimization system 216 retrains the trained classifier using a second plurality of training data. In some example embodiments, the second plurality of training data includes the portion of the first plurality of sample data based on the identifying of the portion of the first plurality of sample data as corresponding to confused prediction. In some example embodiments, each one of the second plurality of training data comprises profile data of a user, textual data distinct from the profile data, and a label indicating whether or not the one of the second plurality of training data qualifies as a measurable accomplishment.

The method 1500 may then proceed to operation 1410, previously discussed with respect to the method 1400 of FIG. 14, in which the optimization system 216 accesses a profile of a first user of an online service stored in a database of the online service, and then operation 1420, previously discussed with respect to the method 1400 of FIG. 14, in which the optimization system 216 generates a suggestion for adding an identified measurable accomplishment to a particular section of a page of the first user. In some example embodiments, the optimization system 216 identifies the measurable accomplishment of the first user based on profile data of the accessed profile of the first user using the retrained classifier.

In some example embodiments, the optimization system 216 is configured to repeat the operations 1520, 1530, and 1540, generating corresponding likelihood values for sample data, identifying a portion of the sampled data as corresponding to confused predictions based on the corresponding likelihood values, and retraining the classifier using the identified portion of the sampled data, until the portion of sample data being identified by the optimization system 216 as corresponding to confused predictions is below a threshold value (e.g., until less than 2% of the samples data is identified as corresponding to confused predictions).

It is contemplated that any of the other features described within the present disclosure can be incorporated into the method 1500.

In some example embodiments, the operations of identifying job postings, extracting phrases from the identified job postings, determining corresponding sections of a page to suggest for placement of the extracted phrases, generating recommendations for the page, and displaying the generated recommendations discussed above employ any combination of one or more of the implementations features discussed below.

In some example embodiments, the optimization system 216 uses certain techniques to evaluate free-text content. In some example embodiments, every word in free-text can be represented as a vector. Given a sequence of training words, the objective of a word vector model employed by the optimization system 216 may be to maximize the average log probability of a word given its surrounding context, such as:

$$\frac{1}{T}\sum_{t=k}^{T-k} \log p(w_t \mid w_{t-k}, \ldots, w_{t+k}).$$

The prediction task may be performed via a multiclass classifier, such as a softmax or normalized exponential function:

$$p(w_t \mid w_{t-k}, \ldots, w_{t+k}) = \frac{w^{y_{w_t}}}{\sum_i e^{y_i}}.$$

Each of $y_i$ is an un-normalized log-probability for each output word i, computed as:

$$y = b + Uh(w_{t-k}, \ldots, w_{t+k}; W),$$

where U,b are the softmax parameters, h is constructed by a concatenation or average of word vectors extracted from W.

In some example embodiments, the optimization system 216 extends the word representation concept to sentences and paragraphs, such as those in profiles and job postings. The following embedding methods have proven effective and may be used by the optimization system 216 in representing arbitrary text lengths, which may be referred to as documents, in order to align with common academic terminology: Doc2Vec—uses the embedding network to infer a vector for the whole document; FastText—infers a document embedding from the pre-trained model, by averaging the pre-computed representations of the text's components (words and n-grams), in a single linear pass through the text; and Universal Sentence Encoder—uses deep averaging network to combine multiple word representation to a sentence/paragraph or document representation.

In some example embodiments, once the algorithm to embed a set of tokens into a vector is chosen, the optimization system 216 computes a document embedding and computed the embedding of each candidate phrase separately, again with the same algorithm, which may be used as an input to a downstream ranking model. In some example embodiments, computing a document embedding includes a noise reduction procedure, which may include using only a subset of sentences in the document that are deemed "important" or using only the adjectives and nouns contained in the input sentence (e.g., a sentence of the job description or the profile).

Embeddings may serve a key role in understanding properties contained within free-text fields. However, they ultimately have limitations. Although text can easily be converted to vectors of continuous values, vectors cannot be so easily converted to grammatically correct text. Also, understanding how text can be manipulated in order to move from a starting representation to a final representation while abiding to explicit syntactical rules is unclear. Therefore, in some example embodiments, the optimization system 216 uses a quality profile detection technique, in which suggested text, such as a suggested phrase of a recommendation, is provided as a tuple composed of a verb and an object, in accordance with the subject-verb-object grammatical structure, with the subject implicitly being the author of a page (e.g., the user to whom a resume or profile page at issue corresponds), the verb being a method of expression, and the object being the expression.

In some example embodiments, the optimization system 216 approaches the problem of quality profile detection as two sub-problems—detection and ranking. In the detection aspect, the optimization system 216 determines what a profile is expressing in its free-text fields. In the ranking aspect, the ranking aspect, the optimization system 216 determines what can be more voluminously expressed in a page of the user (e.g., in a profile or resume of the user).

In some example embodiments, the optimization system 216 addresses the detection aspect by, given a fixed vocabulary of verb and object types, V, and O, we can formulating the detection as a classification problem:

$$\arg\max_{v \in V, o \in O} P(v, o \mid \text{sentence}).$$

Regarding the previously-discussed embedding of arbitrary sentence lengths, the optimization system 216 may seed with pre-trained embeddings for semantic similarity in formulating a classification to detect a fixed set of verb-object pairs:

$$\operatorname{argmax}_{v \in V, o \in O} \prod_{s \in S} P(v, o \mid f(s)),$$

where S represents all sentences that can be described by the VERB-OBJECT pair v-o.

Alternatively, since each sentence (or group of sentences) may be described by multiple verb-object pairs, instead of optimizing output for the loss against a continuous value P, the optimization system 216 may optimize against a binary vector of length |V|+|O|, where the first |V| dimensions can be mapped to a predefined dictionary of verbs, and the remainder to a dictionary of predefined object types. This allows the optimization system 216 to represent a sentence or even a paragraph over a distribution of verbs and objects.

In some example embodiments, the optimization system 216 addressed the ranking aspect using the goal of presenting users with actionable composition improvement to their pages, such as their resumes and profile pages. In some example embodiments, the optimization system 216 evaluates profiles based on generated recruiter interest, which may be captured differently for two different job-seeking segments: active jobseekers and passive job seekers. For active jobseekers, success may be measured after the user has applied for a job based on whether a recruiter e-mailed the user, such as to begin the interview process. For passive job seekers, success may be measured independently of the user applying for a job based on a recruiter e-mail. Here, the optimization system 216 may determine the job based on an aggregation of recent jobs the recruiter may have posted. For example, if a user is contacted by five recruiters, and responds to three of them, the job interests of the user may be based on an aggregation of postings for those three recruiters.

Using y=1 to represent success, the optimization system 216 may optimize for:

$$\text{argmax}_{v \in V, o \in O} P(y|g[f(s)] + (\vec{v}, \vec{o}), \vec{j}) - P(y|g[f(s)], \vec{j}),$$

where $f$ projects a sentence snippet s from a position description, summary, or title, into the semantic embedding space, g projects the embedded vector $\vec{s}$ into the verb-object space, $\vec{v}$ and $\vec{o}$ are unit vectors defined over the verb and object vocabularies respectively, and $\vec{j}$ is a vector representation of a user's job interests. The embedding function $f$ can be used across multiple text snippets in a single sentence classification. However, in this example, the optimization system 216 independently projects two text snippets for a single classification, a position title, and the block describing the position. In some example embodiments, the $P(y|g[f(s)], \vec{j})$ term may be dropped and the optimization system 216 optimizes for:

$$\text{argmax}_{v \in V, o \in O} P(y|g[f(s)] + (\vec{v}, \vec{o}), \vec{j}).$$

In some example embodiments, the end result is a given pairing (e.g., title and work description), and the optimization system 216 ranks all V-O pairs that will most likely increase recruiter interest in a profile. For example, if the top recommendation is QUANTIFY-ACHIEVEMENTS, this implies that adding measurables of achievements to a work description will make a profile more interesting to a recruiter.

In some example embodiments, a component of profile optimization depends on an understanding of a user's job interest. To capture this understanding, the optimization system 216 may utilize summarization techniques across the job postings a user has interacted with. In some example embodiments, the optimization system 216 extracts candidate phrases from the text, such as based on part-of-speech sequences. In some example embodiments, the optimization system 216 keeps only those phrases that consist of zero or more adjectives followed by one or multiple nouns. In some example embodiments, the optimization system 216 also uses sentence embeddings to represent both the candidate phrases and the document itself in the same high-dimensional vector space, and then ranks the candidate phrases to select the output keyphrases. In addition, the optimization system 216 may improve the ranking step by providing a way to tune the diversity of the extracted key phrases.

Although a brute-force method might consider all words and/or phrases in a document as candidate key phrases, such an approach has its disadvantages. Given computational costs of the brute-force method and the fact that not all words and phrases in a document are equally likely to convey its content, the optimization system 216 may employ heuristics to identify a smaller subset of better candidates in performing candidate phrase selection. Examples of heuristics that may be employed by the optimization system 216 include, but are not limited to, removing stop words and punctuation, filtering for words with certain parts of speech or, for multi-word phrases, certain part-of-speech (POS) patterns, and using external knowledge bases as a reference source of good/bad key phrases.

Rather than taking all of the n-grams (where 1≤n≤5), in some example embodiments, the optimization system 216 limits itself to only noun phrases matching the POS pattern {(<JJ>*<NN.*>+<IN>)?<JJ>*<NN.*>+}, which matches any number of adjectives followed by at least one noun that may be joined by a preposition to one other adjective(s)+noun(s) sequence. This POS pattern is just one example. The pattern may be expanded to include other patterns as well.

In some example embodiments, the optimization system 216 generates recommendations for a single job for which there are sufficient indications that the user is or would be interested. The naive approach would return the top N phrases most closely resembling the job posting from which they were extracted. In scenarios where users directly see the extracted keyphrases (e.g., text summarization, tagging for search), this is problematic, as it may result in redundant keyphrases adversely impacting the user's experience, which can deteriorate to the point in which providing keyphrases becomes completely useless. Moreover, in extracting a fixed number of top keyphrases, redundancy hinders the diversification of the extracted keyphrases.

In some example embodiments, the optimization system 216 employs a Maximal Marginal Relevance (MMR) metric to solve the diversity problem. The use of the MMR metric combines in a controllable way the concepts of relevance and diversity. The following describes how to adapt MMR to keyphrase extraction, in order to combine keyphrase informativeness with dissimilarity among selected keyphrases.

The original MMR from information retrieval and text summarization is based on the set of all initially retrieved documents R for a given input query Q, and on an initially empty set S representing documents that are selected as good answers for Q. S is iteratively populated by computing MMR as described in the equation below, where $D_i$ and $D_j$ are retrieved documents, and $Sim_1$ and $Sim_2$ are similarity functions.

$$MMR = \text{arg max}_{D_i \in R \setminus S}[\lambda \cdot Sim_1(D_i, Q) - (1-\lambda) \cdot \max_{D_j \in S} Sim_2(D_i, D_j)].$$

To use MMR to summarize a single job $D_i$, the optimization system 216 may adopt it to certain notation as follows:

$$MMR_i = \text{arg max}_{D_{ij} \in R \setminus S}[\lambda \cdot Sim_1(D_{i,j}, D_i) - (1-\lambda) - \max_{D_{ik} \in S} Sim_2(D_{i,j}, D_{i,k})],$$

where R is the set of candidate keyphrases, S is the iteratively populated summary, $D_i$ is the full document embedding, and $D_{ij}$ and $D_{ik}$ are the embeddings of candidate phrases j and k, respectively.

In some example embodiments, the optimization system 216 generates recommendations for multiple jobs for which there are sufficient indications that the user is or would be interested. The optimization system 216 may extend the MMR technique for the multi-job-posting case, such as by using any of the following approaches.

In a first approach:

$$MMR = \arg\max_{D_{ij} \in R \setminus S}[\lambda \cdot Sim_1(D_{i,j}, D) - (1-\lambda) \cdot \max_{D_{ik} \in S} Sim_2(D_{i,j}, D_{i,k})],$$

where D is the document vector representing all jobs of interest to the member.

In a second approach:

$$MMR = \arg\max_{D_{ij} \in R \setminus S}[\lambda \cdot \max_{D_{ik} \forall k} Sim_1(D_{i,j}, D_{i,k}) - (1-\lambda) \cdot \max_{D_{ik} \in S} Sim_2(D_{i,j}, D_{i,k})]$$

where D is the document vector representing all jobs of interest to the member.

In a third approach:

$$MMR = \arg\max_{D_{ij} \in R \setminus S}[\lambda \cdot Sim_1(D_{i,j}, D) - (1-\lambda) \cdot \Sigma_{D_{ik} \in S} Sim_2(D_{i,j}, D_{i,k})].$$

In a fourth approach:

$$MMR = \arg\max_{D_{ij} \in R \setminus S}[\lambda \cdot \max_{D_{ik} \forall k} Sim_1(D_{i,j}, D_{i,k}) - (1-\lambda) \cdot \Sigma_{D_{ik} \in S} Sim_2(D_{i,j}, D_{i,k})].$$

Figure 16:
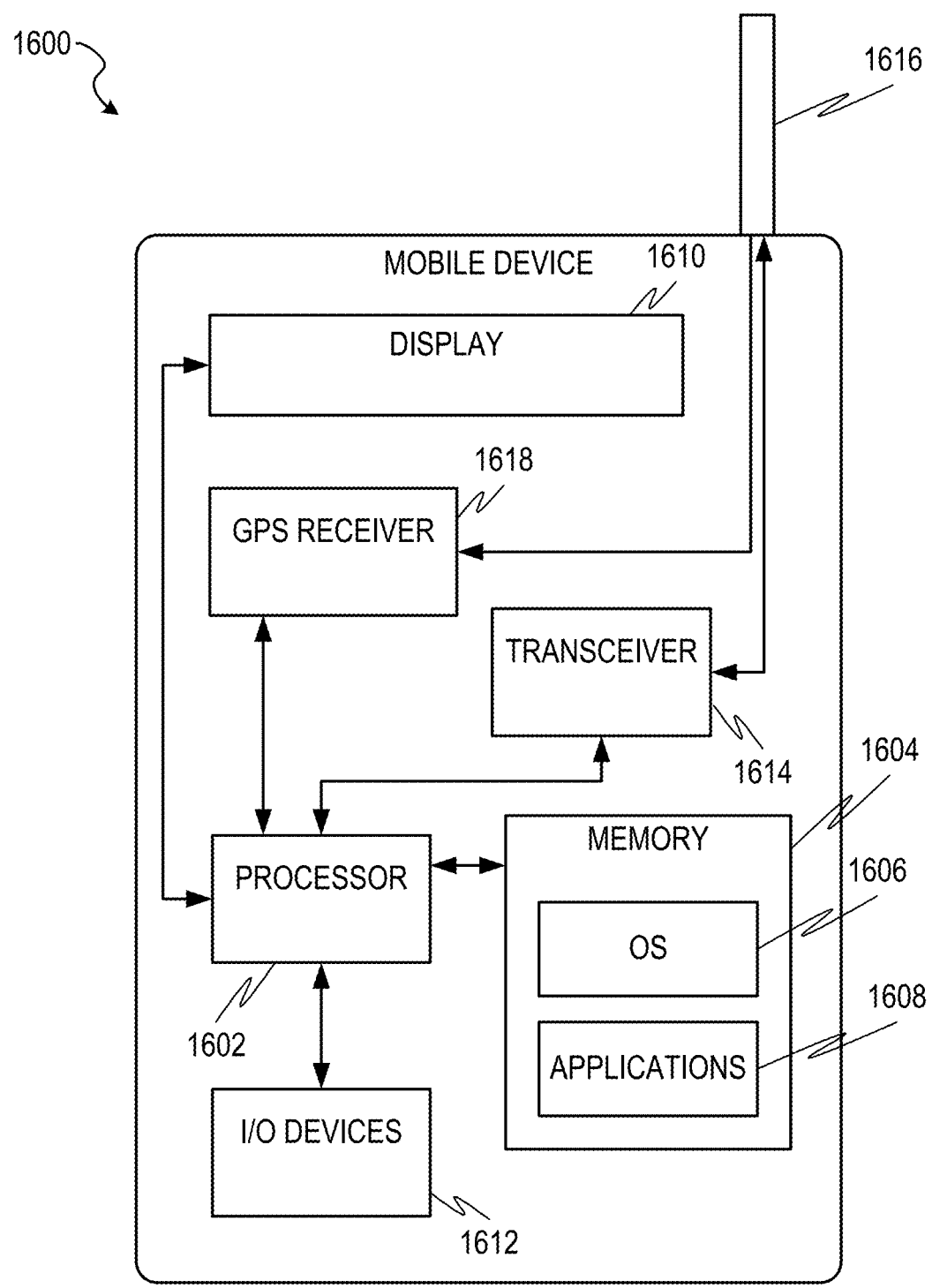
FIG. 16 is a block diagram illustrating a mobile device, in accordance with some example embodiments.

FIG. 16 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 17:
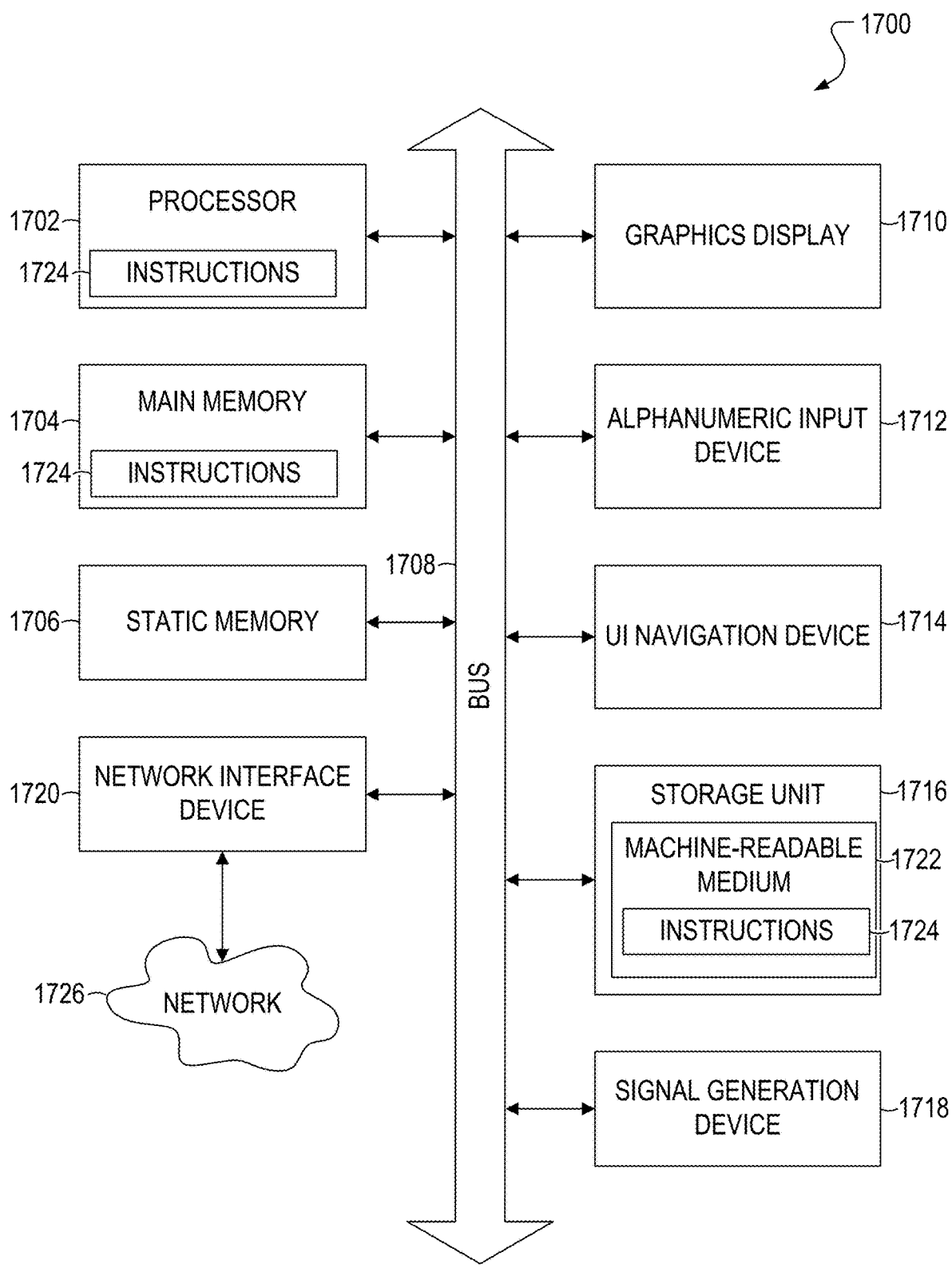
FIG. 17 is a block diagram of an example computer system on which methodologies described herein may be executed, in accordance with an example embodiment.

FIG. 17 is a block diagram of an example computer system 1700 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a graphics display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following numbered examples are embodiments.

1. A computer-implemented method comprising:
    identifying, by a computer system having a memory and at least one hardware processor, a plurality of job postings published on an online service as corresponding to a type of job based on corresponding feature data of each one of the plurality of job postings;
    extracting, by the computer system, a plurality of phrases from the identified plurality of job postings based on a corresponding relevancy measurement and a corresponding diversity measurement for each one of the plurality of phrases, the relevancy measurement comprising a measure of relevance of the corresponding phrase to the type of job, and the diversity measurement comprising a measure of distinction between the corresponding phrase and other phrases in the plurality of phrases;
    for each one of the extracted plurality of phrases, determining, by the computer system, a corresponding section of a page of a first user to suggest for placement of the extracted phrase using a placement classifier, the placement classifier configured to determine the corresponding section based on the extracted phrase;
    for each one of the extracted plurality of phrases, generating, by the computer system, a corresponding recommendation for the page of the first user based on the extracted phrase and the determined corresponding section of the extracted phrase, the corresponding recommendation comprising a suggested addition of the corresponding extracted phrase to the corresponding section of the page of the first user; and
    causing, by the computer system, the generated recommendations to be displayed on a first computing device of the first user.

2. The computer-implemented method of example 1, wherein the causing the generated recommendations to be displayed on the first computing device of the first user comprises causing a corresponding selectable user interface element to be displayed in association with each one of the generated recommendations, and the computer-implemented method further comprises:
    receiving, by the computer system, a user selection of the corresponding selectable user interface element of one of the displayed recommendations from the first computing device of the first user;
    in response to the user selection, causing, by the computer system, the extracted phrase corresponding to the selected user interface element to be displayed in a text field of the determined corresponding section of the extracted phrase on the first computing device of the first user, the text field being configured to receive user-entered text;
    receiving, by the computer system, an instruction from the first computing device of the first user to save the user-entered text that is in the text field to the determined corresponding section of the page of the first user, the user-entered text comprising at least a portion of the extracted phrase corresponding to the selected user interface element; and
    storing, by the computer system, the user-entered text including the at least a portion of the extracted phrase in a database in association with the determined corresponding section of the page of the first user.

3. The computer-implemented method of example 2, further comprising:
    receiving, by the computer system, a request to view the page of the first user from a second computing device of a second user; and
    causing, by the computer system, the page of the first user to be displayed on the second computing device of the second user, the page comprising the user-entered text including the at least a portion of the extracted phrase.

4. The computer-implemented method of any one of examples 1 to 3, wherein the page comprises a profile page of the first user that is associated with a profile of the first user, the profile being stored in a database of the online service in association with a profile of the first user.

5. The computer-implemented method of any one of examples 1 to 4, wherein the page comprises a resume of the first user that is included in an application to a job posting via the online service.

6. The computer-implemented method of any one of examples 1 to 5, wherein the corresponding feature data of each one of the plurality of job postings comprises at least one of a role within an organization, a seniority level, an industry, and a job function.

7. The computer-implemented method of any one of examples 1 to 6, wherein, for each one of the extracted plurality of phrases, the corresponding section of the page comprises one of a summary section of a profile, a work experience section of the profile, an education section of the profile, a skills section of the profile, and an accomplishments section of the profile.

8. The computer-implemented method of any one of examples 1 to 7, further comprising:
    accessing, by the computer system, a profile of the first user stored in a database;
    generating, by the computer system, a suggestion for adding a measurable accomplishment to a particular section of the profile of the first user based on profile data of the accessed profile using a neural network model, the neural network model being configured to identify the measurable accomplishment within the profile data of the accessed profile; and
    causing, by the computer system, the generated suggestion for adding the measurable accomplishment to be displayed on the first computing device of the first user.

9. A computer-implemented method comprising:
    receiving, by a computer system having a memory and at least one hardware processor, a plurality of job postings published on an online service;
    determining, by the computer system, that a subset of the plurality of the job postings satisfies a similarity criteria based on corresponding feature data of each job posting in the subset, the subset comprising multiple job postings;
    selecting, by the computer system, the subset of the plurality of job postings based on the determining that the subset satisfies the similarity criteria;

generating, by the computer system, a recommendation for a page of a first user based on the selected subset of job postings, the recommendation comprising a suggested addition of content to the page of the first user; and causing, by the computer system, the generated recommendation for the page of the first user to be displayed on a computing device of the first user.

10. The computer-implemented method of example 9, wherein the receiving the plurality of job postings comprises:

accessing user activity data of the first user stored in a database in association with a profile of the first user;

determining that the user activity data indicates an interest by the first user in the plurality of job postings; and selecting the plurality of job postings based on the determining that the user activity data indicates an interest by the first user in the plurality of job openings.

11. The computer-implemented method of example 10, wherein the user activity data comprises at least one of viewing a job listing and submitting an application for a job listing.

12. The computer-implemented method of any one of examples 9 to 11, wherein the determining that the subset of the plurality of the job postings satisfies the similarity criteria comprises using at least one filter to determine that the corresponding feature data of each job posting in the subset of the plurality of job postings matches a filter feature data.

13. The computer-implemented method of any one of examples 9 to 12, wherein the determining that the subset of the plurality of the job postings satisfies the similarity criteria comprises using semantic matching to determine that the corresponding feature data of each job posting in the subset of the plurality of job postings comprises a similar meaning as the corresponding feature data of the other job postings in the subset of the plurality of job postings.

14. The computer-implemented method of any one of examples 9 to 13, wherein the corresponding feature data of each one of the subset of the plurality of job postings comprises at least one of a role within an organization, a seniority level, an industry, and a job function.

15. The computer-implemented method of any one of examples 9 to 14, wherein the page comprises a profile page of the first user that is associated with a profile of the first user, the profile being stored in a database of an online service in association with a profile of the first user.

16. The computer-implemented method of any one of examples 9 to 15, wherein the page comprises a resume of the first user that is included in an application to a job posting via an online service.

17. A computer-implemented method comprising:

receiving, by a computer system having a memory and at least one hardware processor, a plurality of phrases for a type of job;

selecting, by the computer system, a group of phrases from the plurality of phrases based on a corresponding relevancy measurement and a corresponding diversity measurement for each phrase in the selected group of phrases, the relevancy measurement comprising a measure of relevance of the corresponding selected phrase in the selected group of phrases to the type of job, and the diversity measurement comprising a measure of distinction between each phrase in the selected group of phrases and other phrases in the selected group of the phrases;

generating, by the computer system, a recommendation for a page of a first user based on the selected group of phrases, the recommendation comprising a suggested addition of the selected group of phrases to the page of the first user; and causing, by the computer system, the generated recommendation for the page of the first user to be displayed on a computing device of the first user.

18. The computer-implemented method of example 17, wherein the selecting the group of phrases from the plurality of phrases comprises:

for each one of the plurality of phrases, generating the corresponding relevance measurement;

ranking the plurality of phrases based on their corresponding relevance measurements;

selecting a first phrase of the plurality of phrases for inclusion in the group of phrases based on the first phrase having a highest ranking amongst the plurality of phrases;

identifying a second phrase of the plurality of phrases based on the second phrase having a second highest ranking amongst the plurality of phrases;

determining a diversity measurement of the second phrase indicating the measure of distinction between the second phrase and the first phrase; and determining whether or not to include the second phrase in the group of phrases based on the determined diversity measurement of the second phrase.

19. The computer-implemented method of example 18, wherein the determining whether or not to include the second phrase in the group of phrases comprises including the second phrase in the group of phrases based on the determined diversity measurement of the second phrase.

20. The computer-implemented method of example 18, wherein the determining whether or not to include the second phrase in the group of phrases comprises excluding the second phrase from the group of phrases based on the determined diversity measurement of the second phrase.

21. The computer-implemented method of any one of examples 17 to 20, wherein the receiving the plurality of phrases for the type of job comprises:

selecting sentences from one or more job listings of the type of job based on the selected sentences being determined to comprise role-dependent information that corresponds to a role in an organization; and extracting noun phrases from the selected sentences, the extracted noun phrases being included in the plurality of phrases, and a remaining portion of the selected sentences other than the extracted noun phrases being omitted from the plurality of phrases.

22. The computer-implemented method of any one of examples 17 to 21, wherein the receiving the plurality of phrases for the type of job comprises extracting the plurality of phrases from one or more job listings of the type of job.

23. The computer-implemented method of any one of examples 17 to 22, wherein the page comprises a profile page of the first user that is associated with a profile of the first user, the profile being stored in a database of an online service in association with a profile of the first user.

24. The computer-implemented method of any one of examples 17 to 23, wherein the page comprises a resume of the first user that is included in an application to a job posting of the type of job via an online service.

25. A computer-implemented method comprising:
receiving, by a computer system having a memory and at least one hardware processor, a plurality of phrases;
for each one of the plurality of phrases, selecting, by the computer system, a corresponding section of a page of a first user to suggest for placement of the phrase from amongst a plurality of sections using a placement classifier, the placement classifier configured to determine the corresponding section based on the phrase;
for each one of the plurality of phrases, generating, by the computer system, a corresponding recommendation for the page of a first user based on the phrase and the determined corresponding section of the page of the first user, the recommendation comprising a suggested addition of the phrase to the determined corresponding section of the page of the first user; and
causing, by the computer system, the generated recommendations for the page of the first user to be displayed on a first computing device of the first user.

26. The computer-implemented method of example 25, wherein the plurality of sections comprises at least one of a summary section, a skill section, a work experience section, and an education section.

27. The computer-implemented method of example 25 or example 26, wherein the causing the generated recommendations to be displayed on the first computing device of the first user comprises causing a corresponding selectable user interface element to be displayed in association with each one of the generated recommendations, and the computer-implemented method further comprises:
receiving, by the computer system, a user selection of the corresponding selectable user interface element of one of the displayed recommendations from the first computing device of the first user; and
in response to the user selection, generating, by the computer system, causing the extracted phrase corresponding to the selected user interface element to be displayed in a text field of the determined corresponding section of the extracted phrase on the first computing device of the first user, the text field being configured to receive user-entered text.

28. The computer-implemented method of example 27, further comprising:
receiving, by the computer system, an instruction from the first computing device of the first user to save the user-entered text that is in the text field to the determined corresponding section of the page of the first user, the user-entered text comprising at least a portion of the extracted phrase corresponding to the selected user interface element; and
storing, by the computer system, the user-entered text including the at least a portion of the extracted phrase in a database in association with the determined corresponding section of the page of the first user.

29. The computer-implemented method of example 28, further comprising using the received instruction to save the user-entered text to the determined corresponding section of the page of the first user as training data in a machine learning algorithm configured to train the placement classifier.

30. The computer-implemented method of example 27, further comprising:
receiving, by the computer system, an instruction from the first computing device of the first user to save the user-entered text that is in the text field to a different section o of the page of the first user other than the determined corresponding section, the user-entered text comprising at least a portion of the extracted phrase corresponding to the selected user interface element; and
storing, by the computer system, the user-entered text including the at least a portion of the extracted phrase in a database in association with the different section of the page of the first user.

31. The computer-implemented method of example 30, further comprising using the received instruction to save the user-entered text to the different section of the page of the first user as training data in a machine learning algorithm configured to train the placement classifier.

32. The computer-implemented method of any one of examples 25 to 31, wherein the page comprises a profile page of the first user that is associated with a profile of the first user, the profile being stored in a database of an online service in association with a profile of the first user.

33. The computer-implemented method of any one of examples 25 to 32, wherein the page comprises a resume of the first user that is included in an application to a job posting of the type of job via an online service.

34. A computer-implemented method comprising:
accessing, by a computer system having a memory and at least one hardware processor, a profile of a first user of an online service stored in a database of the online service;
generating, by the computer system, a suggestion for adding a measurable accomplishment to a particular section of a page of the first user based on profile data of the accessed profile using a neural network model, the neural network model being configured to identify the measurable accomplishment based on the profile data of the accessed profile; and
causing, by the computer system, the generated suggestion for adding the measurable accomplishment to be displayed on a first computing device of the first user.

35. The computer-implemented method of example 34, wherein the profile data comprises a current job title of the first user and textual data distinct from the current job title, and the neural network model is configured to identify the measurable accomplishment based on the current job title of the first user and the textual data.

36. The computer-implemented method of example 35, wherein the textual data comprises text from a summary section of the profile of the first user or text from a work experience section of the profile of the first user, and the measurable accomplishment comprises at least a portion of the textual data.

37. The computer-implemented method of example 36, wherein the profile data further comprises at least one of a seniority level of the first user, a location of the first user, an industry of the first user, and a role of the first user within an organization.

38. The computer-implemented method of any one of examples 34 to 37, wherein the causing the generated suggestion to be displayed comprises causing a selectable user interface element to be displayed in association with the generated suggestion, and the computer-implemented method further comprises:
   receiving, by the computer system, a user selection of the selectable user interface element of one of the displayed suggestion from the first computing device of the first user;
   in response to the user selection, causing, by the computer system, the measurable accomplishment to be displayed in a text field of the particular section of the page of the first user on the first computing device of the first user, the text field being configured to receive user-entered text;
   receiving, by the computer system, an instruction from the first computing device of the first user to save the user-entered text that is in the text field to the particular section of the page of the first user, the user-entered text comprising at least a portion of the measurable accomplishment; and
   storing, by the computer system, the user-entered text including the at least a portion of the measurable accomplishment in a database in association with the particular section of the page of the first user.

39. The computer-implemented method of any one of examples 34 to 38, wherein the particular section of the page comprises a summary section of the page or a work experience section of the page.

40. The computer-implemented method of any one of examples 34 to 39, wherein the page comprises a profile page of the first user that is associated with the profile of the first user.

41. The computer-implemented method of any one of examples 34 to 40, wherein the page comprises a resume of the first user that is included in an application to a job posting of a type of job via the online service.

42. A computer-implemented method comprising:
   training, by a computer system having a memory and at least one hardware processor, a classifier using a first plurality of training data, each one of the first plurality of training data comprising profile data of a user, textual data distinct from the profile data, and a label indicating whether or not the one of the first plurality of training data qualifies as a measurable accomplishment;
   for each one of a first plurality of sample data, generating, by the computer system, a corresponding likelihood value indicating a likelihood that the one of the first plurality of sample data corresponds to a measurable accomplishment using the trained classifier, each one of the first plurality of sample data comprising profile data of a user and textual data distinct from the profile data;
   identifying, by the computer system, a portion of the first plurality of sample data as corresponding to confused predictions based on the corresponding likelihood values of the portion of the first plurality of sample data and a confusion criteria; and
   retraining, by the computer system, the trained classifier using a second plurality of training data, the second plurality of training data including the portion of the first plurality of sample data based on the identifying of the portion of the first plurality of sample data as corresponding to confused prediction, each one of the second plurality of training data comprising profile data of a user, textual data distinct from the profile data, and a label indicating whether or not the one of the second plurality of training data qualifies as a measurable accomplishment.

43. The computer-implemented method of claim 42, wherein the confusion criteria comprises the corresponding likelihood value being below a minimum threshold value or above a maximum threshold value.

44. The computer-implemented method of claim 42, wherein the confusion criteria comprises:
   a difference between the corresponding likelihood value of one of the portion of the plurality of sample data and the corresponding likelihood value of another one of the portion of the plurality of sample data is greater than a threshold difference value; and
   a difference between the textual data of the one of the portion of the plurality of sample data and the textual data of the other one of the portion of the plurality of sample data is less than a threshold textual difference.

45. The computer-implemented method of claim 42, further comprising:
   accessing, by the computer system, a profile of a first user of an online service stored in a database of the online service;
   identifying, by the computer system, a measurable accomplishment of the first user based on profile data of the accessed profile of the first user using the retrained classifier;
   generating, by the computer system, a suggestion for adding the identified measurable accomplishment to a particular section of a page of the first user; and
   causing, by the computer system, the generated suggestion for adding the measurable accomplishment to be displayed on a first computing device of the first user 46. The computer-implemented method of claim 45, wherein the profile data comprises a current job title of the first user and textual data distinct from the current job title, and the neural network model is configured to identify the measurable accomplishment based on the current job title of the first user and the textual data.

47. The computer-implemented method of claim 46, wherein the textual data comprises text from a summary section of the profile of the first user or text from a work experience section of the profile of the first user, and the measurable accomplishment comprises at least a portion of the textual data.

48. The computer-implemented method of claim 47, wherein the profile data further comprises at least one of a seniority level of the first user, a location of the first user, an industry of the first user, and a role of the first user within an organization.

49. The computer-implemented method of claim 45, wherein the causing the generated suggestion to be displayed comprises causing a selectable user interface element to be displayed in association with the generated suggestion, and the computer-implemented method further comprises:
   receiving, by the computer system, a user selection of the selectable user interface element of one of the displayed suggestion from the first computing device of the first user;
   in response to the user selection, causing, by the computer system, the measurable accomplishment to be displayed in a text field of the particular section of the page of the first user on the first computing device of the first user, the text field being configured to receive user-entered text;

receiving, by the computer system, an instruction from the first computing device of the first user to save the user-entered text that is in the text field to the particular section of the page of the first user, the user-entered text comprising at least a portion of the measurable accomplishment; and storing, by the computer system, the user-entered text including the at least a portion of the measurable accomplishment in a database in association with the particular section of the page of the first user.

50. The computer-implemented method of claim 45, wherein the particular section of the page comprises a summary section of the page or a work experience section of the page.

51. The computer-implemented method of claim 45, wherein the page comprises a profile page of the first user that is associated with the profile of the first user.

52. The computer-implemented method of claim 45, wherein the page comprises a resume of the first user that is included in an application to a job posting of a type of job via the online service.

53. A system comprising:
at least one processor; and
a non-transitory computer-readable medium storing executable instructions that, when executed, cause the at least one processor to perform the method of any one of examples 1 to 52.

54. A non-transitory machine-readable storage medium, tangibly embodying a set of instructions that, when executed by at least one processor, causes the at least one processor to perform the method of any one of examples 1 to 52.

55. A machine-readable medium carrying a set of instructions that, when executed by at least one processor, causes the at least one processor to carry out the method of any one of examples 1 to 52.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
receiving, by a computer system having a memory and at least one hardware processor, a plurality of phrases for a type of job;

selecting, by the computer system, a group of phrases from the plurality of phrases based on a corresponding relevancy measurement and a corresponding diversity measurement for each phrase in the selected group of phrases, the relevancy measurement comprising a measure of relevance of the corresponding selected phrase in the selected group of phrases to the type of job, and the diversity measurement comprising a measure of distinction between each phrase in the selected group of phrases and other phrases in the selected group of the phrases, the selecting the group of phrases from the plurality of phrases comprising:

for each one of the plurality of phrases, generating the corresponding relevance measurement;

ranking the plurality of phrases based on their corresponding relevance measurements:

selecting a first phrase of the plurality of phrases for inclusion in the group of phrases based on the first phrase having a highest ranking amongst the plurality of phrases;

identifying a second phrase of the plurality of phrases based on the second phrase having a second highest ranking amongst the plurality of phrases;

determining a diversity measurement of the second phrase indicating the measure of distinction between the second phrase and the first phrase; and determining whether or not to include the second phrase in the group of phrases based on the determined diversity measurement of the second phrase;

generating, by the computer system, a recommendation for a page of a first user based on the selected group of phrases, the recommendation comprising a suggested addition of the selected group of phrases to the page of the first user; and causing, by the computer system, the generated recommendation for the page of the first user to be displayed on a computing device of the first user.

2. The computer-implemented method of claim 1, wherein the determining whether or not to include the second phrase in the group of phrases comprises including the second phrase in the group of phrases based on the determined diversity measurement of the second phrase.

3. The computer-implemented method of claim 1, wherein the determining whether or not to include the second phrase in the group of phrases comprises excluding the second phrase from the group of phrases based on the determined diversity measurement of the second phrase.

4. The computer-implemented method of claim 1, wherein the receiving the plurality of phrases for the type of job comprises:
selecting sentences from one or more job listings of the type of job based on the selected sentences being determined to comprise role-dependent information that corresponds to a role in an organization; and extracting noun phrases from the selected sentences, the extracted noun phrases being included in the plurality of phrases, and a remaining portion of the selected sentences other than the extracted noun phrases being omitted from the plurality of phrases.

5. The computer-implemented method of claim 1, wherein the receiving the plurality of phrases for the type of job comprises extracting the plurality of phrases from one or more job listings of the type of job.

6. The computer-implemented method of claim 1, wherein the page comprises a profile page of the first user that is associated with a profile of the first user, the profile being stored in a database of an online service in association with a profile of the first user.

7. The computer-implemented method of claim 1, wherein the page comprises a resume of the first user that is included in an application to a job posting of the type of job via an online service.

8. A system comprising:
at least one hardware processor; and
a non-transitory machine-readable medium embodying a set of instructions that, when executed by the at least one hardware processor, cause the at least one hardware processor to perform operations, the operations comprising:
receiving a plurality of phrases for a type of job;
selecting a group of phrases from the plurality of phrases based on a corresponding relevancy measurement and a corresponding diversity measurement for each phrase in the selected group of phrases, the relevancy measurement comprising a measure of relevance of the corresponding selected phrase in the selected group of phrases to the type of job, and the diversity measurement comprising a measure of distinction between each phrase in the selected group of phrases and other phrases in the selected group of the phrases, the selecting the group of phrases from the plurality of phrases comprising:
for each one of the plurality of phrases, generating the corresponding relevance measurement;
ranking the plurality of phrases based on their corresponding relevance measurements:
selecting a first phrase of the plurality of phrases for inclusion in the group of phrases based on the first phrase having a highest ranking amongst the plurality of phrases:
identifying a second phrase of the plurality of phrases based on the second phrase having a second highest ranking amongst the plurality of phrases:
determining a diversity measurement of the second phrase indicating the measure of distinction between the second phrase and the first phrase; and
determining whether or not to include the second phrase in the group of phrases based on the determined diversity measurement of the second phrase;
generating a recommendation for a page of a first user based on the selected group of phrases, the recommendation comprising a suggested addition of the selected group of phrases to the page of the first user; and
causing the generated recommendation for the page of the first user to be displayed on a computing device of the first user.

9. The system of claim 8, wherein the determining whether or not to include the second phrase in the group of phrases comprises including the second phrase in the group of phrases based on the determined diversity measurement of the second phrase.

10. The system of claim 8, wherein the determining whether or not to include the second phrase in the group of phrases comprises excluding the second phrase from the group of phrases based on the determined diversity measurement of the second phrase.

11. The system of claim 8, wherein the receiving the plurality of phrases for the type of job comprises:
selecting sentences from one or more job listings of the type of job based on the selected sentences being determined to comprise role-dependent information that corresponds to a role in an organization; and
extracting noun phrases from the selected sentences, the extracted noun phrases being included in the plurality of phrases, and a remaining portion of the selected sentences other than the extracted noun phrases being omitted from the plurality of phrases.

12. The system of claim 8, wherein the receiving the plurality of phrases for the type of job comprises extracting the plurality of phrases from one or more job listings of the type of job.

13. The system of claim 8, wherein the page comprises a profile page of the first user that is associated with a profile of the first user, the profile being stored in a database of an online service in association with a profile of the first user.

14. The system of claim 8, wherein the page comprises a resume of the first user that is included in an application to a job posting of the type of job via an online service.

15. A non-transitory machine-readable medium embodying a set of instructions that, when executed by at least one hardware processor, cause the at least one hardware processor to perform operations, the operations comprising:
receiving a plurality of phrases for a type of job;
selecting a group of phrases from the plurality of phrases based on a corresponding relevancy measurement and a corresponding diversity measurement for each phrase in the selected group of phrases, the relevancy measurement comprising a measure of relevance of the corresponding selected phrase in the selected group of phrases to the type of job, and the diversity measurement comprising a measure of distinction between each phrase in the selected group of phrases and other phrases in the selected group of the phrases, the selecting the group of phrases from the plurality of phrases comprising:
for each one of the plurality of phrases, generating the corresponding relevance measurement;
ranking the plurality of phrases based on their corresponding relevance measurements:
selecting a first phrase of the plurality of phrases for inclusion in the group of phrases based on the first phrase having a highest ranking amongst the plurality of phrases;
identifying a second phrase of the plurality of phrases based on the second phrase having a second highest ranking amongst the plurality of phrases;
determining a diversity measurement of the second phrase indicating the measure of distinction between the second phrase and the first phrase; and
determining whether or not to include the second phrase in the group of phrases based on the determined diversity measurement of the second phrase:
generating a recommendation for a page of a first user based on the selected group of phrases, the recommendation comprising a suggested addition of the selected group of phrases to the page of the first user; and causing the generated recommendation for the page of the first user to be displayed on a computing device of the first user.

16. The non-transitory machine-readable medium of claim 15, wherein the determining whether or not to include the second phrase in the group of phrases comprises including the second phrase in the group of phrases based on the determined diversity measurement of the second phrase.

17. The non-transitory machine-readable medium of claim 15, wherein the determining whether or not to include the second phrase in the group of phrases comprises excluding the second phrase from the group of phrases based on the determined diversity measurement of the second phrase.

18. The non-transitory machine-readable medium of claim 15, wherein the receiving the plurality of phrases for the type of job comprises extracting the plurality of phrases from one or more job listings of the type of job.

19. The non-transitory machine-readable medium of claim 15, wherein the page comprises a profile page of the first user that is associated with a profile of the first user, the profile being stored in a database of an online service in association with a profile of the first user.

20. The non-transitory machine-readable medium of claim 15, wherein the page comprises a resume of the first user that is included in an application to a job posting of the type of job via an online service.

* * * * *

UNITED STATES PATENT AND TRADEMARK OFFICE
CERTIFICATE OF CORRECTION

PATENT NO. : 11,048,876 B2  
APPLICATION NO. : 16/206292  
DATED : June 29, 2021  
INVENTOR(S) : Gee et al.

Page 1 of 1

It is certified that error appears in the above-identified patent and that said Letters Patent is hereby corrected as shown below:

In the Claims

In Column 38, Line 24, in Claim 1, delete "measurements:" and insert --measurements;-- therefor In Column 39, Line 38, in Claim 8, delete "measurements:" and insert --measurements;-- therefor In Column 39, Line 42, in Claim 8, delete "phrases:" and insert --phrases;-- therefor In Column 39, Line 46, in Claim 8, delete "phrases:" and insert --phrases;-- therefor In Column 40, Line 50, in Claim 15, delete "measurements:" and insert --measurements;-- therefor In Column 40, Line 63, in Claim 15, delete "phrase:" and insert --phrase;-- therefor Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*